US008499655B2

(12) United States Patent
Matsumoto

(10) Patent No.: US 8,499,655 B2
(45) Date of Patent: Aug. 6, 2013

(54) MULTISTAGE TRANSMISSION

(75) Inventor: Shinya Matsumoto, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 492 days.

(21) Appl. No.: 12/828,881

(22) Filed: Jul. 1, 2010

(65) Prior Publication Data

US 2011/0023639 A1 Feb. 3, 2011

(30) Foreign Application Priority Data

Jul. 31, 2009 (JP) ................................. 2009-178504
Aug. 31, 2009 (JP) ................................. 2009-199219

(51) Int. Cl.
*F16H 3/10* (2006.01)
(52) U.S. Cl.
USPC .......................................... 74/325; 74/337.5
(58) Field of Classification Search
USPC ................ 74/335, 337.5, 362, 363, 366, 368, 74/369, 371, 372, 325
See application file for complete search history.

(56) References Cited

U.S. PATENT DOCUMENTS

| | | | |
|---|---|---|---|
| 1,997,698 A | 4/1935 | Peterson | |
| 5,029,689 A | 7/1991 | Grimm | |

FOREIGN PATENT DOCUMENTS

| | | |
|---|---|---|
| EP | 2 065 606 A1 | 6/2009 |
| JP | 2009-74640 A | 4/2009 |
| JP | 2010-78050 A | 4/2010 |

*Primary Examiner* — William C Joyce
(74) *Attorney, Agent, or Firm* — Birch, Stewart, Kolasch & Birch, LLP

(57) ABSTRACT

A multistage transmission includes a lost motion mechanism for regulating the operation for a downward shift in acceleration and for an upward shift in deceleration. Regulating rods are integrally moved with a control rod. A cutout into which a pin can be fitted together with a cam groove of the slidingly touched cam rod is formed corresponding to each cam groove in the regulating rods. The cutout of the regulating rods corresponding to the cam groove of the cam rod for normal rotation is formed longer than the corresponding cam groove on the reverse side to a moving direction of the control rod in an upward shift in a state in which shifted speed is established. The cutout of the regulating rods corresponding to the cam groove of the cam rod for reverse rotation is formed longer than the corresponding cam groove on the reverse side to a moving direction.

10 Claims, 23 Drawing Sheets

MULTISTAGE TRANSMISSION

CROSS-REFERENCE TO RELATED APPLICATIONS

The present application claims priority under 35 USC 119 to Japanese Patent Application No. 2009-178504 filed on Jul. 31, 2009 and Japanese Patent Application No. 2009-199219 filed on Aug. 31, 2009 the entire contents of which are hereby incorporated by reference.

BACKGROUND OF THE INVENTION

1. Field of the Invention

This invention relates to a multistage transmission in which a plurality of driving gears and a plurality of driven gears are journaled to mutually parallel gear shafts in a constantly engaged state at every speed.

2. Description of Background Art

In this constant-mesh type multistage transmission, either set of the driving gears or the driven gears is fixed to the gear shaft, the other set is turnably journaled to the gear shaft, and a shift is executed by switching gears fitted to the rotated shaft out of turnable gears by fitting means.

The configuration is known by the present applicant wherein a lost motion mechanism includes shift driving means that executes a shift by switching fitting means which are provided between a plurality of gears and the gear shaft and which fits one gear and the gear shaft for driving the new gear. See, for example, JP Patent No. 2008-246754.

As for the shift driving means of the multistage transmission disclosed in JP Patent No. 2008-246754, a control rod arranged along a central axis of a hollow part of the gear shaft is slidingly touched inside four types of cam rods axially movably slidingly touched to an inside periphery of the hollow gear shaft. Lost motion mechanisms are laterally arranged inside the four types of cam rods with each lost motion mechanism being coupled to the required cam rod.

In the lost motion mechanism, a spring that axially acts is inserted between the control rod and each cam rod for interlock and the lost motion mechanism is housed in the hollow part of the gear shaft.

When the control rod is moved for a shift, the fitting means, the fitting of which is previously maintained, is naturally released by this lost motion mechanism in transition from a state in which the fitting before the shift by the fitting means is maintained to a state of fitting after the shift by the fitting means. Thus, a smooth transition is enabled, and shifts are smoothly executed without discontinuation.

An upward shift in acceleration and a downward shift in deceleration are smoothly executed as described above. However, in a downward shift in acceleration and an upward shift in deceleration, as the fitting means the fitting of which is maintained before the shift is not naturally released, the shift cannot be executed without any means.

However, as the control rod is moved by the lost motion mechanism though the shift cannot be executed, a driver (a rider) who operates the shift has a sense of incompatibility for a situation wherein the shift is disenabled though the operation is enabled.

When the control rod is moved by turning a shift drum by a predetermined angle by operation for a shift and the shift is executed, fitting by fitting means before the shift is maintained till fitting by fitting means after the shift by the lost motion mechanism, the fitting by the fitting means before the shift is smoothly released by the fitting by the fitting means after the shift, and shifts are smoothly executed without discontinuation.

As the fitting by the fitting means before the shift is maintained till the fitting by the fitting means after the shift, the shift drum is turned when operation for the next shift is executed before the fitting by the fitting means before the shift is released, a spring of the lost motion mechanism is further compressed, the control rod is moved, a state in which the fitting means after the shift is made fittable is released because of the further movement of the control rod, the fitting by the fitting means before the shift cannot be finally released, and the shift is disenabled.

Nevertheless, as the shift drum is turned, a situation wherein a shift position of the shift drum and the actual speed are not matched occurs.

SUMMARY AND OBJECTS OF THE INVENTION

According to an embodiment of the present invention, a multistage transmission is provided with a lost motion mechanism that can execute a smooth shift and can regulate operation for a downward shift in acceleration and operation for an upward shift in deceleration.

According to an embodiment of the present invention, a multistage transmission includes a plurality of driving gears and a plurality of driven gears that are journaled to mutually parallel gear shafts in a constantly engaged state for every speed, the plurality of gears of either of the driving gears or the driven gears are fixed to the gear shaft and a shift is executed by switching fitting means which are provided between the other plurality of gears and the gear shaft and fit them by shift driving means and driving the new gear. The fitting means includes a normal rotation type fitting means and a reverse rotation type fitting means fittable in only each rotation direction of the normal rotation in which power from an internal combustion engine is transmitted of the gear and reverse rotation in which power from the side of a driving wheel is transmitted, each fitting means is provided with a fitting projection portion provided in a plurality of locations in a circumferential direction of an inside face of each gear with a fitting face in the circumferential direction; a fitting member availably provided to the gear shaft and detachably fitted to the fitting projection portion of each gear; a plurality of cam rods which are axially slidably supported by the gear shaft and on each sliding face of which a plurality of cam grooves are formed in required locations in an axial direction; and a pin which is fitted in a diametrical direction in the required locations of the gear shaft, which is alternately touched to the sliding face of the cam rod axially moved and the cam groove, advances and retreats and which operates the fitting member. The shift driving means is provided with a control rod provided along a central axis in a hollow part of the gear shaft inside the plurality of cam rods; and a lost motion mechanism inserted between the outside periphery of the control rod and inside faces of the plurality of cam rods and interlocks the control rod and each cam rod via a spring that axially acts, a regulating rod moved integrally with the control rod is slidingly touched to the cam rod and is provided to the gear shaft, a cutout into which the pin can be fitted together with the cam groove of the slidingly touched cam rod is formed corresponding to each cam groove on the regulating rod, the cutout of the regulating rod corresponding to the cam groove of the cam rod for normal rotation is formed longer than the cam groove on the reverse side to a direction in which the control rod is moved in an upward shift in a state in which speed is established, and the cutout of the regulating rod corresponding to the cam groove of the cam rod for reverse rotation is formed longer than the cam groove on the reverse side to a direction in which the control rod is moved in a downward shift in a state in which speed is established.

According to an embodiment of the present invention, the regulating rod is axially relatively slidably provided, and held between the cam rod for normal rotation and the cam rod for reverse rotation.

According to an embodiment of the present invention, the regulating rod is formed by a member separate from the control rod and is connected by connecting means so that the regulating rod is moved integrally with the control rod.

According to an embodiment of the present invention, the connecting means is a half cotter, the half cotter is fitted into both a fitting groove provided on the outside periphery of the control rod and a fitting groove provided on an inside face of the regulating rod and the regulating rod is integrally connected to the control rod.

According to an embodiment of the present invention, as for the cam rod and the regulating rod, the rods provided with the same function are arranged on the outside periphery of the control rod in symmetrical positions oppositely.

According to an embodiment of the present invention, in the multistage transmission in which the control rod is operated, either of the two types of fitting means for normal rotation and for reverse rotation is switched via the lost motion mechanism and a shift is executed, as the regulating rod integrally moved with the control rod is provided to the gear shaft with the regulating rod slidingly touched to the cam rod and the cutout of the regulating rod corresponding to the cam groove of the cam rod for normal rotation is formed longer than the cam groove on the reverse side to the moving direction of the control rod in the upward shift in a state in which speed is established. The control rod integrated with the regulating rod is moved and the upward shift is smoothly executed because the cutout of the regulating rod has more clearance on the reverse side to the moving direction than the pin of the fitting means fitted into the cutout of the regulating rod when the control rod is moved to shift upward in acceleration in which power from the internal combustion engine is transmitted. However, when the movement of the control rod is tried so as to shift downward in acceleration, the cutout of the regulating rod has less clearance on the reverse side to the moving direction than the pin of the fitting means fitted into the cutout, the movement of the control rod is regulated together with the regulating rod, operation for the downward shift itself is regulated, and a driver (a rider) who tries the operation has no sense of compatibility.

In addition, as the cutout of the regulating rod corresponding to the cam groove of the cam rod for reverse rotation is formed longer than the cam groove on the reverse side to the moving direction of the control rod in the downward shift in a state in which speed is established, the control rod integrated with the regulating rod is moved and the downward shift is smoothly executed because the cutout of the regulating rod has more clearance on the reverse side to the moving direction than the pin of the fitting means fitted to the cutout when the control rod is moved so as to shift downward in deceleration in which power from the side of the driving wheel is transmitted. However, when the movement of the control rod is tried so as to shift upward in deceleration, the cutout of the regulating rod has less clearance on the reverse side to the moving direction than the pin of the fitting means fitted into the cutout, the movement of the control rod is regulated together with the regulating rod and the operation for the upward shift itself is regulated. Thus, a driver (a rider) who tries the operation has no sense of compatibility.

According to an embodiment of the present invention, as the regulating rod is axially relatively slidably provided with the regulating rod held between the cam rod for normal rotation and the cam rod for reverse rotation, one slidable groove has only to be provided to the gear shaft that supports the regulating rod and the cam rods for normal rotation and for reverse rotation in the common axial direction without providing a dedicated groove to each and a man-hour for working can be reduced.

Thus, the cutouts corresponding to the cam grooves of the two cam rods for normal rotation and for reverse rotation can be provided to one regulating rod and the number of parts can be reduced.

According to an embodiment of the present invention, as the regulating rod is formed by the separate member from the control rod and is connected to the control rod by the connecting means to enable integral movement, the regulating rod and the control rod are separately formed and can be more easily worked than a case wherein the regulating rod and the control rod are integrated.

According to an embodiment of the present invention, as the half cotter is fitted into both the fitting groove provided to the outside periphery of the control rod and the fitting groove provided to the inside face of the regulating rod and the regulating rod is integrally connected to the control rod, the control rod and the regulating rod respectively separate can be integrally connected with a simple connecting structure.

According to an embodiment of the present invention, as the cam rod and the regulating rod respectively having the same function are arranged opposite in symmetrical positions on the outside periphery of the control rod, the movement of the control rod can be evenly transmitted to the cam rod and the regulating rod, the axis is maintained, and the movement can be smoothed.

According to an embodiment of the present invention, a multistage transmission is provided that prevents a wrong operation by regulating continuous operation for a shift at an extremely short time interval for avoiding a situation wherein a shift position of a shift drum and the actual speed are not matched.

According to an embodiment of the present invention, a multistage transmission includes a plurality of driving gears and a plurality of driven gears that are journaled to mutually parallel gear shafts in a constantly engaged state every speed, the plurality of gears of either of the driving gears or the driven gears are fixed to the gear shaft and a shift is executed by switching each fitting means which is provided between the other plurality of gears and the gear shaft and which fits each other by shift driving means. The fitting means is provided with a fitting part provided relative to circumferential plural locations on an inside face of each gear with a fitting face in a circumferential direction, a fitting member provided to the gear shaft and detachably fitted to the fitting part of each gear and a plurality of cam rods which are axially movably slidingly touched to an inside periphery of the hollow gear shaft, on each sliding face of which a plurality of cam faces are formed in axial required locations and which are operated by the movement of the fitting member. The shift driving means is provided with a control rod axially movably provided along a central axis of the hollow gear shaft inside the plurality of cam rods and a lost motion mechanism which is inserted between the control rod and the plurality of cam rods and which interlocks the control rod and each cam rod via a spring that axially acts. The lost motion regulating means prohibits lost motion operation over one stage of a shift for the lost motion mechanism.

According to an embodiment of the present invention, the lost motion mechanism is configured by a spring holder which covers an outside recessed portion formed by reducing a diameter of the control rod, which is slidably armored on the control rod in an axial position, which is integrally fitted to a required cam rod and where an inside recessed portion having the same axial length as the outside recessed portion is formed corresponding to the outside recessed portion, a pair of spring bearers are made opposite across both space of the outside recessed portion of the control rod and the corresponding inside recessed portion of the spring holder and the spring which is inserted between the pair of spring bearers and which pushes both spring bearers in directions in which they are separated. An extended-diameter stopper part, a diameter of which is extended, is formed in the axial center of the outside recessed portion of the control rod as the lost motion regulating means and both end faces of the extended-diameter stopper part are opposite to the pair of spring bearers with moving distance for one stage of a shift maximum between both end faces.

According to an embodiment of the present invention, the spring bearer is configured by a split cotter acquired by splitting an annular shape in two and the spring holder is configured by a bottomed cylindrical member the inside recessed portion of which is axially divided in two.

According to an embodiment of the present invention, the lost motion mechanism is inserted between the outside periphery of the control rod and each inside face of the plurality of cam rods.

According to an embodiment of the present invention, the lost motion mechanism is inserted between an axial end of the cam rod and the outside periphery of the control rod.

According to an embodiment of the present invention, the lost motion regulating means that prohibits lost motion operation over one stage of a shift for the lost motion mechanism is provided, a wrong operation is prevented by prohibiting further operation for a shift that causes lost motion operation over one stage of a shift before fitting by the fitting means before a shift is released after operation for the shift for one stage is made. Therefore, a wrong operation is prevented, and a situation wherein a shift position of the shift drum and actual speed are not matched can be avoided.

According to an embodiment of the present invention, the lost motion regulating means can be configured with a simple structure wherein the extended-diameter stopper part, the diameter of which is extended, is formed in the axial center of the outside recessed portion of the control rod.

According to an embodiment of the present invention, as the spring bearer is configured by the split cotter and the spring holder is configured by the bottomed cylindrical member the inside recessed portion of which is axially divided in two, the split cotter is arranged in each recessed portion on both sides even if the extended-diameter stopper part is formed in the axial center of the outside recessed portion of the control rod, the spring holder can be easily mounted, and the assembly of the lost motion mechanism is facilitated.

According to an embodiment of the present invention, as the lost motion mechanism is inserted between the outside periphery of the control rod and each inside face of the plurality of cam rods, the axial width of the transmission can be reduced.

According to an embodiment of the present invention, as the lost motion mechanism is inserted between the axial end of the cam rod and the outside periphery of the control rod, the assembly of the lost motion mechanism is easy and the lost motion mechanism is excellent in assembly workability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to FIGS. 1 to 17, the present invention will be described below wherein a multistage transmission 10 is built in an internal combustion engine mounted in a motorcycle.

Figure 1:
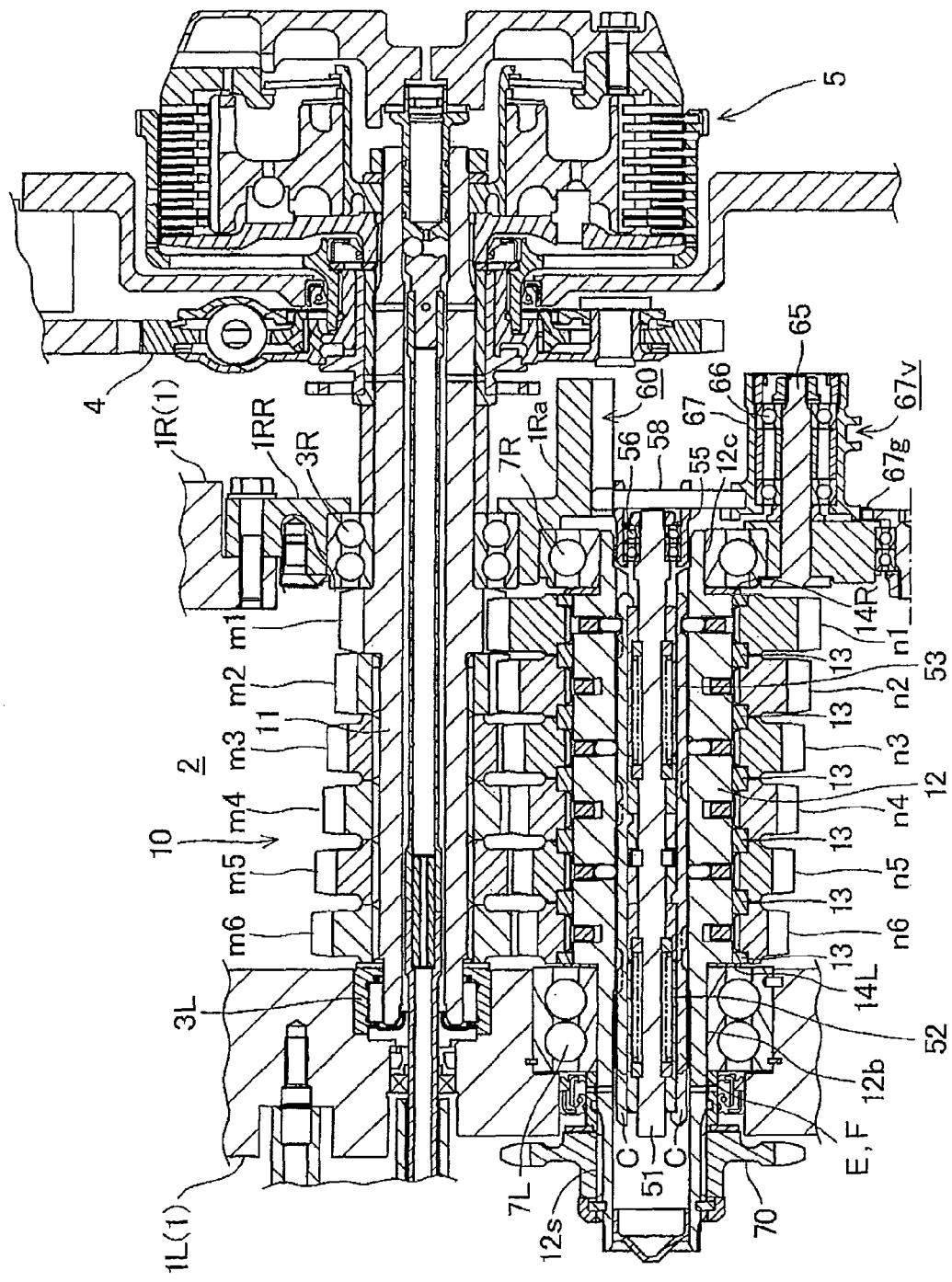
FIG. 1 is a sectional view showing a multistage transmission equivalent to one embodiment of this invention.

FIG. 1 is a sectional view showing the multistage transmission 10 and as shown in FIG. 1, the multistage transmission 10 is provided to an engine casing 1 that also covers the internal combustion engine.

The engine casing 1 is configured by uniting a left engine casing 1L and a right engine casing 1R, respectively, wherein the laterally divided forms a transmission chamber 2 with a main gear shaft 11 and a counter gear shaft 12 being rotatably journaled to the transmission chamber 2 with the gear shafts laterally laid mutually in parallel.

The main gear shaft 11 is rotatably journaled to a side wall of the left engine casing 1L and a side wall 1RR of the right engine casing 1R via each bearing 3L, 3R and pierces the right bearing 3R. A multi-disc type friction clutch 5 is provided to its right end and projects from the transmission chamber 2.

A primary driven gear 4 to which the rotation of a crankshaft not shown is transmitted is rotatably journaled to the main gear shaft 11 on the left side of the friction clutch 5.

The rotation of the crankshaft of the internal combustion engine is transmitted to the main gear shaft 11 via the friction clutch 5 in a connected state from the primary driven gear 4.

The counter gear shaft 12 is also rotatably journaled to the side wall of the left engine casing 1L and the side wall 1RR of the right engine casing 1R via each bearing 7L, 7R and pierces the left bearing 7L. An output sprocket 70 is fixed to its left end projecting from the transmission chamber 2 via splines.

A driving chain wound onto the output sprocket 70 is wound onto a sprocket that drives a rear wheel not shown behind the output sprocket, the rotational power of the counter gear shaft 12 is transmitted to the rear wheel, and a vehicle is made to operate.

A group m of driving transmission gears is formed between the left and right bearings 3L, 3R on the main gear shaft 11 so that the group can be turned integrally with the main gear shaft 11.

The first driving transmission gear m1 is integrated with the main gear shaft 11 along the right bearing 3R, and second, third, fourth, fifth and sixth driving transmission gears m2, m3, m4, m5, m6 each diameter of which is sequentially increased in order from the right to the left are fitted to a spline formed between the first driving transmission gear m1 of the main gear shaft 11 and the left bearing 3L via each spline.

In addition, a group n of driven transmission gears is turnably journaled to the counter gear shaft 12 between the left and right bearings 7L, 7R via each annular bearing collar 13.

On the counter gear shaft 12, the five bearing collars 13 are armored at an equal interval between the bearing collar 13 at its right end armored via a washer 14R mounted on the left side of the right bearing 7R and the bearing collar 13 at its left end armored via a washer 14L mounted on the right side of the left bearing 7L, and first, second, third, fourth, fifth and sixth driven transmission gears n1, n2, n3, n4, n5, n6 each diameter of which is sequentially decreased in order from the right to the left with each driven transmission gear mounted between the adjacent bearing collars 13 of all the seven bearing collars 13 being turnably journaled.

The first, second, third, fourth, fifth and sixth driving transmission gears m1, m2, m3, m4, m5, m6 turned integrally with the main gear shaft 11 are respectively constantly engaged with the corresponding first, second, third, fourth, fifth and sixth driven transmission gears n1, n2, n3, n4, n5, n6 respectively turnably journaled to the counter gear shaft 12.

The engagement of the first driving transmission gear m1 and the first driven transmission gear n1 produces first speed the speed reducing ratio of which is the largest, the engagement of the sixth driving transmission gear m6 and the sixth driven transmission gear n6 produces a sixth speed the speed reducing ratio of which is the smallest, the speed reducing ratio is sequentially decreased between them, and second speed, third speed, fourth speed and fifth speed are produced.

On the counter gear shaft 12, the gears for odd-numbered speeds (the first, third and fifth driven transmission gears n1, n3, n5) and the gears for even-numbered speeds (the second, fourth and sixth driven transmission gears n2, n4, n6) are alternately arranged.

Fitting means 20 which can be fitted to each driven transmission gear n is built in the hollow cylindrical counter gear shaft 12 as described later. A total of four types of eight cam rods C (Cao, Cao, Cae, Cae, Cbo, Cbo, Cbe, Cbe) composed by two every type which is one component of the fitting means 20 as described above and a total of two types of four regulating rods E, F composed by two every type are fitted into cam guide grooves 12g formed on a inside periphery of the hollow counter gear shaft 12 and described later, and the cam rods and the regulating rods are axially movably provided.

A control rod 51 which is one component of shift driving means 50 that drives the cam rod C and shifts speed is inserted along a central axis of a hollow part of the counter gear shaft 12, the axial movement of the control rod 51 integrally moves the regulating rods E, F, and axially moves the cam rod C in interlock via lost motion mechanisms 52, 53.

A mechanism that axially moves the control rod 51 is provided to the right engine casing 1R.

The axial movement of the control rod 51 axially moves the cam rod C in interlock via the lost motion mechanism 52, 53, the movement of the cam rod C selectively fits each driven transmission gear n to the counter gear shaft 12 by the fitting means 20 built in the counter gear shaft 12. Thus, the speed is shifted.

Figure 6:
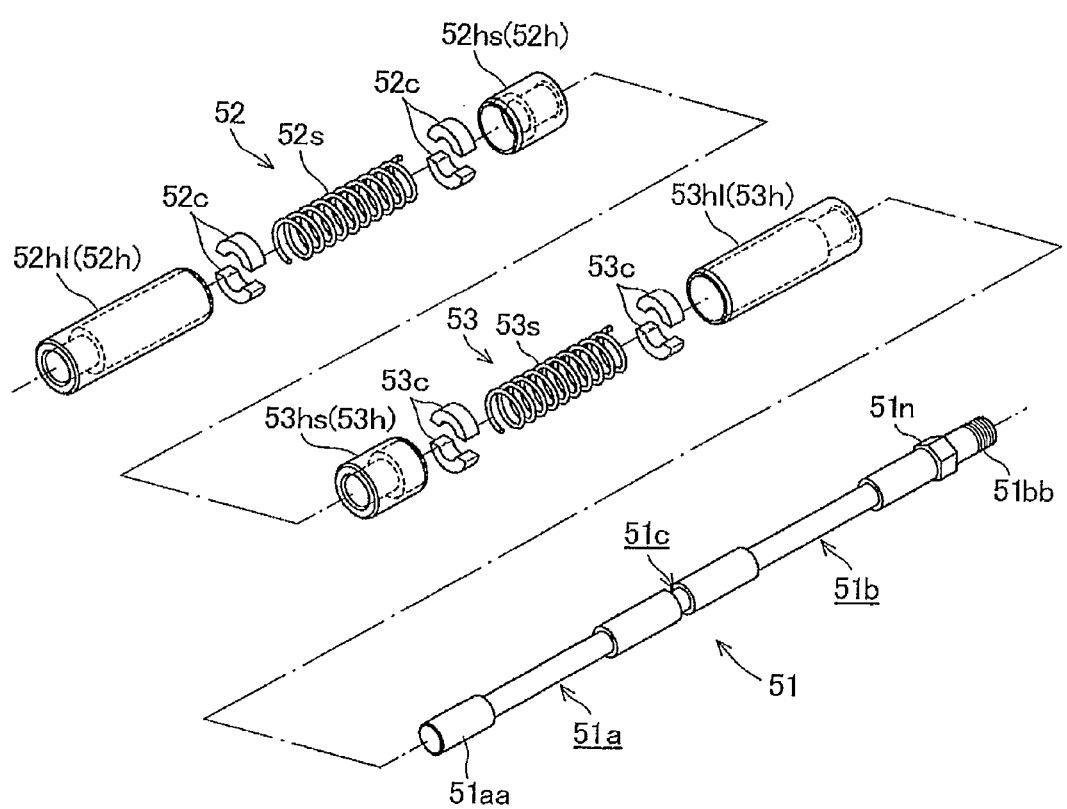
FIG. 6 is an exploded perspective view showing a control rod and a lost motion mechanism.

As shown in FIG. 6, the control rod 51 of the shift driving means 50 is in the shape of a cylindrical rod, a central recessed portion 51c is formed in the center in its axial direction, and further, outside recessed portions 51a, 51b are formed in a predetermined length in two locations laterally.

The left end 51as of the control rod 51 is short and at the right end, a male screw end 51bb where a long male screw is formed and a hexagon nut 51n located before the male screw end 51bb are formed.

The lost motion mechanisms 52, 53 are fitted corresponding to the left and right outside recessed portions 51a, 51b of the control rod 51.

The left and right lost motion mechanisms 52, 53 have the same structure and are arranged bilaterally symmetrically.

A spring holder 52h into which the control rod 51 is slidably fitted of the left lost motion mechanism 52 is configured by coupling a long holder 52hl and a short holder 52hs, and an inside recessed portion 52ha corresponding to the outside recessed portion 51a of the control rod 51 is formed on its inside face.

When the control rod 51 is made to pierce the spring holder 52h and the spring holder 52h is located in the outside recessed portion 51a, both space of the inside recessed portion 52ha of the spring holder 52h and the outside recessed portion 51a of the control rod 51 is made in a common space.

A pair of left and right cotters 52c, 52c for bearing a spring are inserted opposite in both spaces of the inside recessed portion 52ha of the spring holder 52h and the outside recessed portion 51a of the control rod 51, a compression coil spring 52s wound onto the control rod 51 is inserted between both cotters 52c, 52c, and the compression coil spring presses both cotters 52c, 52c in a direction in which both cotters are separated.

The cotter 52c is in the shape of a hollow disc having an inside diameter of the inside recessed portion 52ha of the spring holder 52h as its outside diameter and having an outside diameter of the outside recessed portion 51a of the control rod 51 as its inside diameter and is divided into halves for assembly.

The right lost motion mechanism 53 (a spring holder 53h, a long holder 53hl, a short holder 53hs, an inside recessed portion 53ha, a cotter 53c, a compression coil spring 53s) also has the same structure and is arranged in the outside recessed portion 51b of the control rod 51.

Accordingly, when the control rod 51 is axially moved, the spring holders 52h, 53h are axially moved via the compression coil springs 52s, 53s of the left and right lost motion mechanisms 52, 53.

Figure 7:
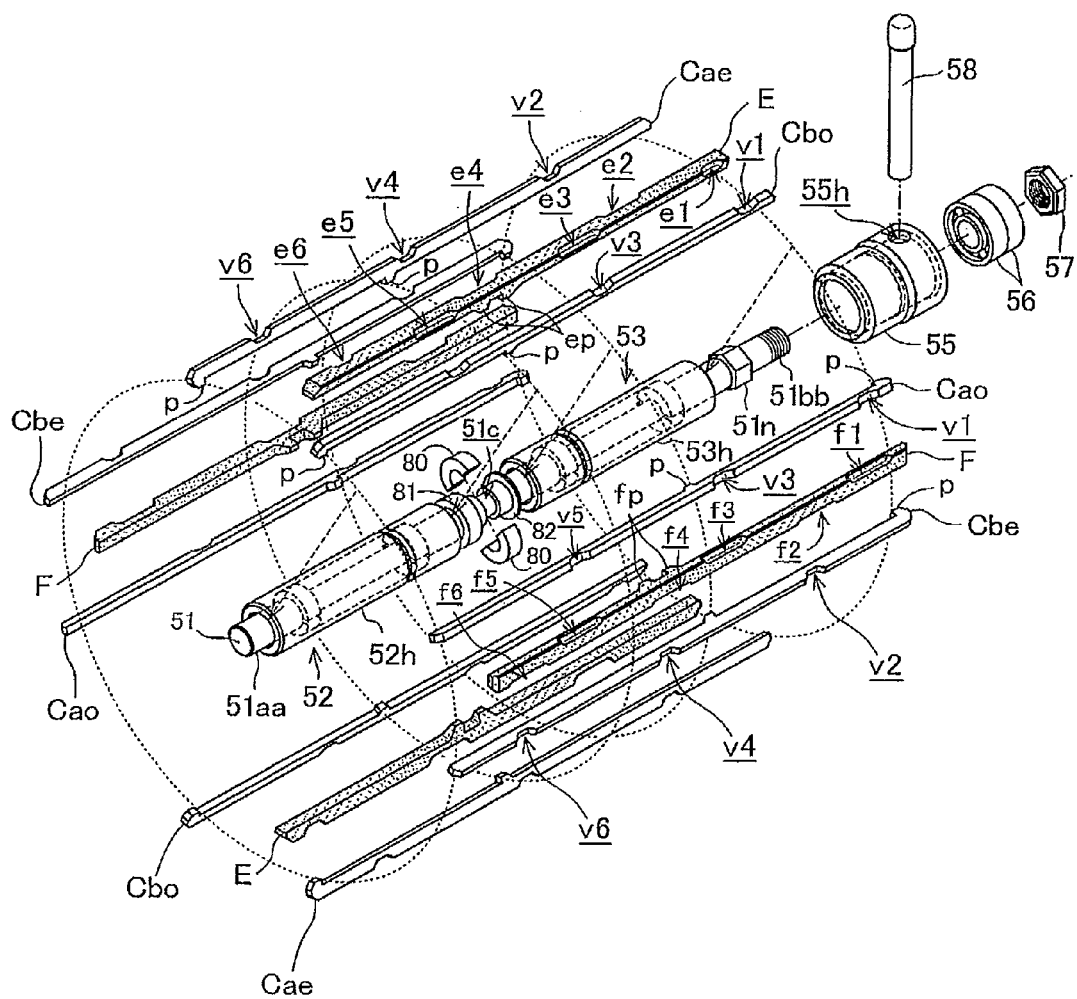
FIG. 7 is an exploded perspective view showing a state in which the lost motion mechanism is mounted on the control rod, cam rods and others.

The eight cam rods C (Cao, Cao, Cae, Cae, Cbo, Cbo, Cbe, Cbe) are radially touched to outside faces of the spring holders 52h, 53h of the lost motion mechanisms 52, 53 mounted in the left and right outside recessed portions 51a, 51b of the control rod 51 (see FIG. 7).

The cam rod C is a prism the section of which is rectangular and which is axially extended long, the peripheral side on the reverse side to the inside touched to the spring holder 52h, 53h forms a cam face, a cam groove v is formed in three required locations on the cam face, and a pair of fitting pawls p for fitting either of the spring holders 52h, 53h with either held between the pair of fitting pawls project from the inner side.

As the cam rod C has no section in a special shape and the outline is substantially the simple rectangular prism, the cam rod C can be easily manufactured.

The cam rods Cao, Cbo for odd-numbered speeds where the cam grooves v1, v3, v5 are formed in the three locations corresponding to the gears for odd-numbered speeds (the first, third and fifth driven transmission gears n1, n3, n5) have two types of a type for normal rotation (a rotational direction in which force is applied to the counter gear shaft 12 from the driven transmission gear n in acceleration) and a type for reverse rotation (a rotational direction in which force is applied to the counter gear shaft 12 from the driven transmission gear n in deceleration). One cam rod Cao for normal rotation and odd-numbered speed is provided with the fitting pawl p for fitting to the right spring holder 53h on the inner side and the other cam rod Cbo for reverse rotation and an odd-numbered speed is provided with the fitting pawl p for fitting to the left spring holder 52h on the inner side (see FIG. 7).

Similarly, the cam rods Cae, Cbe for even-numbered speeds where the cam grooves v2, v4, v6 are formed in the three locations corresponding to the gears for even-numbered speeds (the second, fourth and sixth driven transmission gears n2, n4, n6) have two types, one type for normal rotation and another type for reverse rotation. One cam rod Cae for normal rotation and even-numbered speed is provided with the fitting pawl p for fitting to the left spring holder 52h on the inner side and the other cam rod Cbe for reverse rotation and even-numbered speed is provided with the fitting pawl p for fitting to the right spring holder 53h on the inner side (see FIG. 7).

Accordingly, the cam rod Cao for normal rotation and odd-numbered speed and the cam rod Cbe for reverse rotation and even-numbered speed are axially interlocked with the axial movement of the control rod 51 together with the spring holder 53h via the compression coil spring 53s of the right lost motion mechanism 53, and the cam rod Cbo for reverse rotation and odd-numbered speed and the cam rod Cae for normal rotation and even-numbered speed are axially interlocked together with the spring holder 52h via the coil spring 52s of the left lost motion mechanism 52.

In addition, as shown in FIG. 7, the total four regulating rods composed by the two types of two regulating rods E, F are provided with each regulating rod held between the two cam rods C.

One regulating rod E is installed with the regulating rod E held between the cam rod Cae for normal rotation and even-numbered speed and the cam rod Cbo for reverse rotation and odd-numbered speed and the other regulating rod F is installed with the regulating rod F held between the cam rod Cao for normal rotation and odd-numbered speed and the cam rod Cbe for reverse rotation and even-numbered speed.

Figure 8:
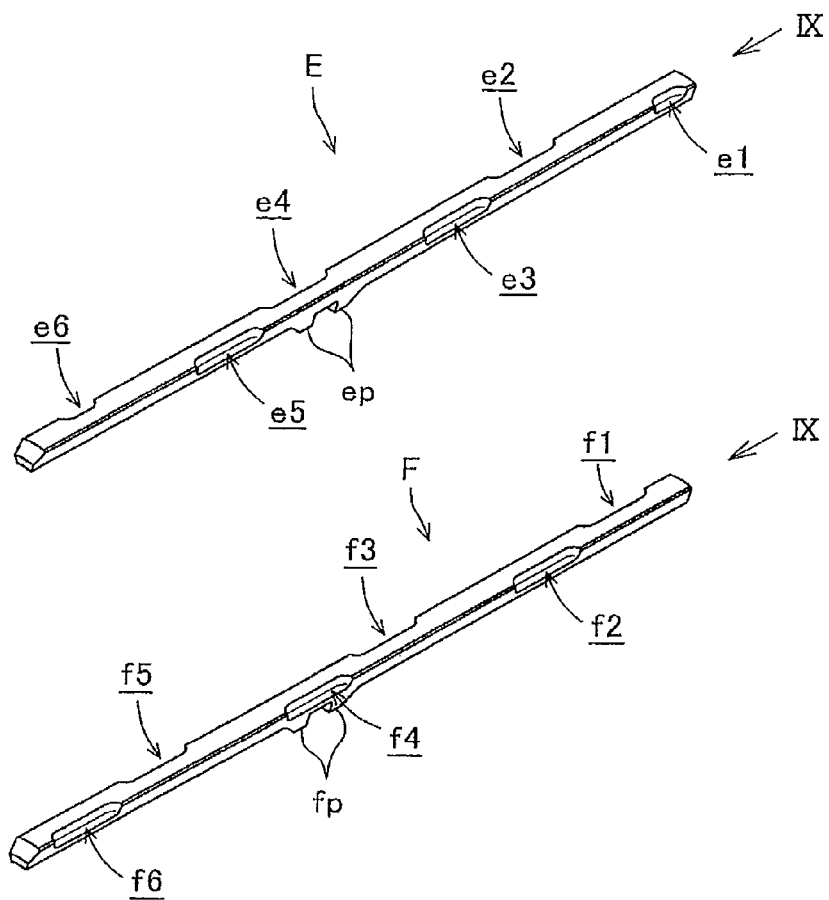
FIG. 8 is a perspective view showing a regulating rod.
Figure 9:
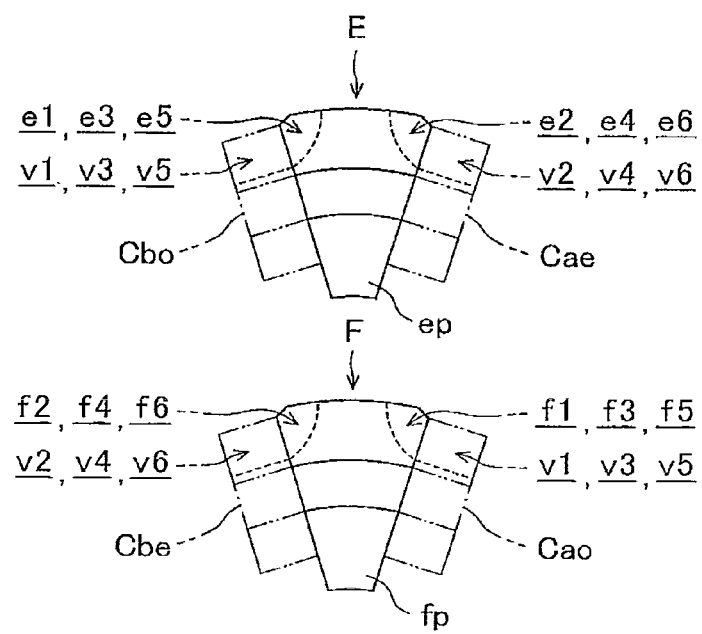
FIG. 9 is a left side view (a view viewed from a direction shown by an arrow IX in FIG. 8) showing the regulating rod.

As shown in FIGS. 8 and 9, each section of the regulating rods E, F is in the shape of a narrow fan, each regulating rod is a laterally long rod, in comparison with the rectangular section of the cam rod C, the diametrical length is substantially the same, and the circumferential width is larger.

As for the regulating rod E, cutouts e2, e4, e6 are formed corresponding to the cam grooves v2, v4, v6 of the cam rod Cae for normal rotation and even-numbered speed at a side edge where the side to which the cam rod Cae for normal rotation and even-numbered speed is slidingly touched and the outside periphery cross, and cutouts e1, e3, e5 are formed corresponding to the cam grooves v1, v3, v5 of the cam rod Cbo for reverse rotation and odd-numbered speed at a side edge where the side to which the cam rod Cbo for reverse rotation and odd-numbered speed is slidingly touched and the outside periphery cross.

Similarly, as for the regulating rod F, cutouts f1, f3, f5 are formed corresponding to the cam grooves v1, v3, v5 of the cam rod Cao for normal rotation and an odd-numbered speed at a side edge where the side to which the cam rod Cao for normal rotation and odd-numbered speed is slidingly touched and the outside periphery cross, and cutouts f2, f4, f6 are formed corresponding to the cam grooves v2, v4, v6 of the cam rod Cbe for reverse rotation and even-numbered speed at a side edge where the side to which the cam rod Cbe for reverse rotation and even-numbered speed is slidingly touched and the outside periphery cross.

The cam grooves v1, v2, v3, v4, v5, v6 all have the same length axially short, while the other cutouts e2, e3, e4, e5 except the cutouts e1 and e6 of the regulating rod E and the cutouts f1, 12, f3, f4, f5, f6 of the regulating rod F are axially longer than the cam groove approximately twice and the cutouts e1 and e6 have the substantially same axial length as that of the cam groove v.

As for the regulating rod E, a pair of fitting pawls ep opposite via predetermined width in predetermined positions in the vicinity of the center in an axial direction on its inside face project and similarly, as for the regulating rod F, a pair of fitting pawls fp also project in predetermined positions on its inside face.

Each regulating rod E, F is arranged with its inside face touched to the spring holder 52h, 53h of each lost motion mechanism 52, 53 in a state in which each regulating rod is held between the two cam rods C (shown by an alternate long and two short dishes line in FIG. 9) as shown in FIG. 9, however, as shown in FIG. 7, a half cotter 80 for assembly is fitted into the central recessed portion 51c of the control rod 51, the pair of fitting pawls ep projecting from the inside face of the regulating rod E and the pair of fitting pawls fp projecting from the inside face of the regulating rod F are fitted to the cotter 80 with the cotter held between the pairs, and the control rod 51 and the regulating rods E, F are connected via the cotter 80.

The control rod 51 and the regulating rods E, F are integrally connected by fitting the cotter into a fitting groove between the fitting pawls ep of the regulating rod E and a fitting groove between the fitting pawls fp of the regulating rod F and fitting the retainer 81 and the washer 82 in a state in which the outside face and one side of the cotter 80 fitted into the central recessed portion 51c of the control rod 51 are coated with a retainer 81 and a washer 82 is touched to the other side of the cotter 80.

Accordingly, the regulating rods E, F are moved laterally in the axial direction integrally with the control rod 51.

As shown in FIG. 7, a control rod operating cylinder 55 is attached to a right end on the right side of the nut 51n of the control rod 51 via a ball bearing 56 fitted inside the operating cylinder.

As for the ball bearing 56, the two ball bearings are axially coupled, are fitted to the right end on the right side of the nut 51n of the control rod 51, and are fastened by a nut 57 screwed on the male screw end 51bb with the ball bearings held between the nut 51n and the nut 57.

Accordingly, the control rod operating cylinder 55 rotatably holds the right end of the control rod 51.

A pin hole 55h bored in a diametrical direction is formed in a cylindrical part extending on the right side of the screwed nut 57 of the control rod operating cylinder 55 with a shift pin 58 piercing the pin hole 55h.

Both ends of the shift pin 58 piercing the control rod operating cylinder 55 project as shown in FIG. 1.

A groove 60 is laterally formed in a guide part 1Ra projecting rightward from the side wall 1RR of the right engine casing 1R and a projecting head at one end of the shift pin 58 is slidably fitted into the groove 60 so as to prevent the shift pin 58 from being turned.

A spindle 65 projects rightwardly from the side wall 1RR, a shift drum 67 is turnably journaled to the spindle 65 via a bearing 66, and the projecting other end of the shift pin 58 is slidably fitted into a shift groove 67v of the shift drum 67.

The shift groove 67v of the shift drum 67 is formed spirally substantially around an outside face of the drum, and there, a position of each speed from the first to the sixth speed and a neutral position on the way of the positions are formed every predetermined turning angle (for example, 60 degrees).

Accordingly, the turning of the shift drum 67 axially moves the shift pin 58 fitted into the shift groove 67v together with the control rod operating cylinder 55.

As the control rod operating cylinder 55 rotatably holds the right end of the control rod 51, the turning of the shift drum 67 finally axially moves the control rod 51.

The shift drum 67 is turned via shift transmission means (not show) by the manual operation of a shift select lever not shown.

The shift transmission means is provided with a mechanism such as a shift cam for stably holding the shift drum 67 in the position of speed for every predetermined angle, transmits power by operating the shift select lever to a gear 67g formed at a side edge of the shift drum 67, and sequentially turns the shift drum 67 to the position of speed.

As described above, in the shift driving means 50, the shift drum 67 is turned by the manual operation of the shift select lever, the turning of the shift drum 67 guides and axially moves the shift pin 58 fitted into the shift groove 67v, the movement of the shift pin 58 axially moves the control rod 51 via the control rod operating cylinder 55, and the eight cam rods Cao, Cao, Cae, Cae, Cbo, Cbo, Cbe, Cbe of the fitting means 20 are made to interlock via the lost motion mechanisms 52, 53 by the movement of the control rod 51.

The control rod 51 on which the lost motion mechanisms 52, 53 are mounted is inserted into the hollow part of the counter gear shaft 12 and is arranged along the central axis.

As for the hollow cylindrical counter gear shaft 12, the inside diameter is substantially equal to the outside diameter of each spring holder 52h, 53h of the lost motion mechanisms 52, 53 and the spring holders 52h, 53h mounted on the control rod 51 are slidably fitted.

Figure 11:
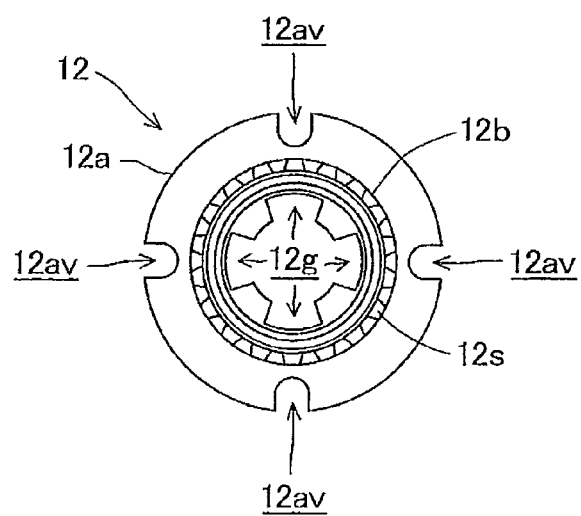
FIG. 11 is a left side view (a view viewed from a direction shown by an arrow XI in FIG. 10) showing the counter gear shaft.

As shown in a left side view showing the counter gear shaft 12 in FIG. 11, four cam guide grooves 12g each section of which is fan-shaped axially extend in four radial positions at an equal interval in a circumferential direction on the inside periphery of the hollow counter gear shaft 12.

The cam rod Cae for normal rotation and even-numbered speed and the cam rod Cbo for reverse rotation and odd-numbered speed respectively holding the regulating rod E between them and the cam rod Cao for normal rotation and odd-numbered speed and the cam rod Cbe for reverse rotation and even-numbered speed respectively holding the regulating rod F between them are slidably fitted into the cam guide grooves 12g.

The same types of cam rods C and the regulating rods E, F are arranged in symmetrical positions.

Accordingly, the movement of the control rod 51 can be evenly transmitted to the cam rods C and the regulating rods E, F, the axis is maintained, and the movement can be smoothed.

As the two cam rods C and one regulating rod E, F which are respectively bundled are fitted into each cam guide groove 12g for preventing the eight cam rods C and the four regulating rods E, F in the counter gear shaft 12 from being turned with the two cam rods and one regulating rod, more cam guide grooves than four are not required, and a man-hour for working the counter gear shaft 12 can be reduced.

The depth of the cam guide groove 12g is substantially equal to the length in a diametrical direction of the cam rod C and the regulating rod E, F, therefore, the cam face which is the peripheral side of the cam rod C is substantially slidingly touched to the bottom of the cam guide groove 12g, the inner side is touched to the outside face of the spring holder 52h, 53h at the substantially same level as the inside periphery, and the fitting pawl p projects from the inner side holds either of the spring holders 52h or 53h from both its sides.

Figure 10:
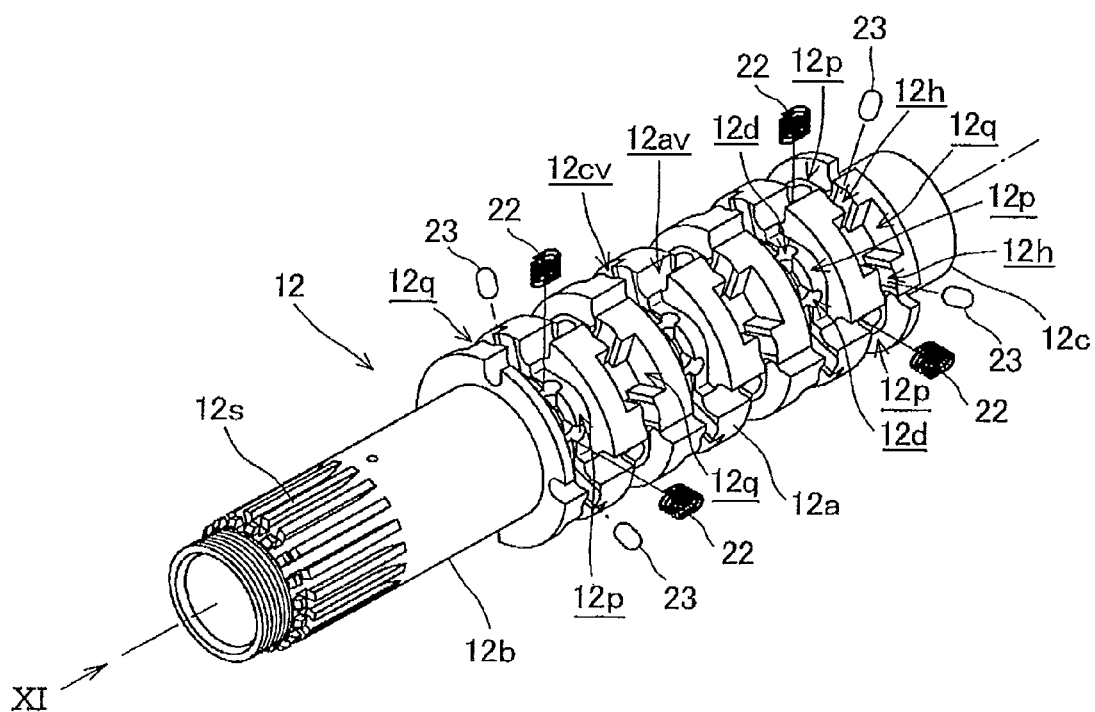
FIG. 10 is an exploded perspective view showing the counter gear shaft, a pin and a part of a spring.

As for the hollow cylindrical counter gear shaft 12, a left cylindrical part 12b the outside diameter of which is reduced and a right cylindrical part 12c are formed on both left and right sides of a central cylindrical part 12a to which the driven transmission gear n is journaled via the bearing collar 13 (see FIG. 10).

The bearing 7L is fitted to the left cylindrical part 12b via a washer 14L, a spline 12s is partially formed and the output sprocket 70 is fitted to the spline. In addition, the bearing 7R is fitted to the right cylindrical part 12c via a washer 14R (see FIGS. 1, 2 and 3).

Figure 2:
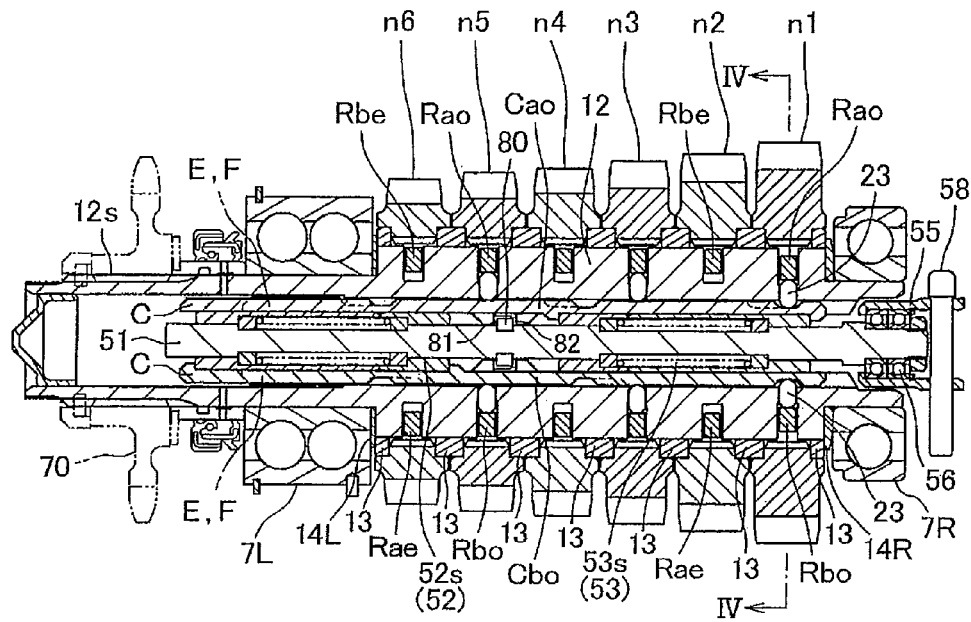
FIG. 2 is a sectional view showing a counter gear shaft and structure around it (a sectional view viewed along a line II-II in FIGS. 4 and 5)
Figure 3:
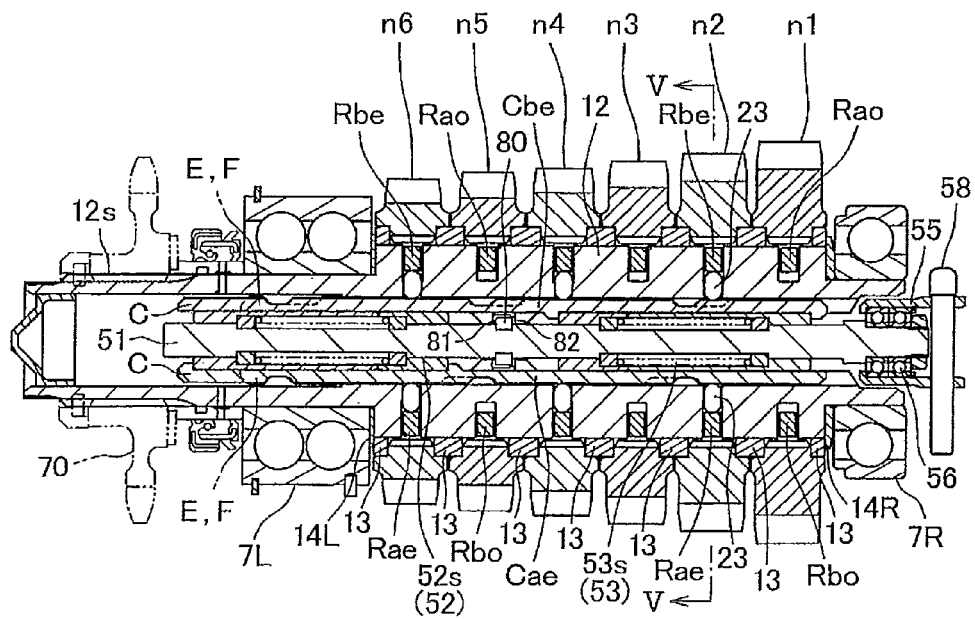
FIG. 3 is another sectional view showing the counter gear shaft and the structure around it (a sectional view viewed along a line in FIGS. 4 and 5)

In the hollow part of the counter gear shaft 12, a small-diameter inside periphery the inside diameter where the cam guide groove 12g is formed which is equal to the outside diameter of the spring holder 52h, 53h and a large-diameter inside periphery the inside diameter on both sides of the small-diameter inside periphery of which is at substantially the same level as the bottom of the cam guide groove 12g are formed (see FIGS. 2 and 3).

The control rod operating cylinder 55 is inserted approximately half inside a right extending inside diameter part.

As described above, when the control rod 51, the lost motion mechanisms 52, 53, the eight cam rods Cao, Cao, Cae, Cae, Cbo, Cbo, Cbe, Cbe and four regulating rods E, F are built in the hollow part of the counter gear shaft 12, all these are turned together, when the control rod 51 is axially moved, the regulating rods E, F are axially moved integrally with the control rod 51, the cam rod Cbo for reverse rotation and odd-numbered speed and the cam rod Cae for normal rotation and even-numbered speed are axially interlocked via the coil spring 52s of the left lost motion mechanism 52, and the cam rod Cao for normal rotation and odd-numbered speed and the cam rod Cbe for reverse rotation and even-numbered speed are axially interlocked via the coil spring 53s of the right lost motion mechanism 53.

As the lost motion mechanisms 52, 53 are inserted between the outside face of the control rod 51 and the inside faces of the plurality of cam rods C with the lost motion mechanisms arranged in the axial direction of the counter gear shaft 12, the extension in the axial direction of the multistage transmission 10 is prevented because of the structure where the control rod 51, the lost motion mechanisms 52, 53 and the cam rods C are overlapped in the diametrical direction in the hollow part of the counter gear shaft 12, the lost motion mechanisms 52, 53 are compactly housed in the hollow part of the counter gear shaft 12, and the multistage transmission 10 itself can be miniaturized.

As the lost motion mechanisms 52, 53 are axially provided on the control rod 51 and each lost motion mechanism 52, 53 interlocks the separate cam rod C, the movement of one control rod 51 separately moves the plurality of cam rods C in two types, as a result, a shift can be smoothed, the manufacturing cost is inhibited by making the lost motion mechanisms 52, 53 a symmetrical structure, and the management of parts in assembly is facilitated.

As shown in FIG. 10, the central cylindrical part 12a of the counter gear shaft 12 to which the driven transmission gears n are journaled via the bearing collars 13 has a large outside diameter and is made thick, six narrow circumferential grooves 12cv are axially formed at an equal interval around the central cylindrical part corresponding to the first, second, third, fourth, fifth and sixth driven transmission gears n1, n2, n3, n4, n5, n6 on the thick outside periphery, and four axial grooves 12av are formed at an equal interval in a circumferential direction.

Further, a long rectangular recessed portion 12p laterally symmetrically extends between the axial grooves 12av where each of four parts partitioned by the four axial grooves 12av is adjacent to the groove width of each circumferential groove 12cv in each circumferential groove 12cv and a short rectangular recessed portion 12q laterally symmetrically extending in a part between the axial grooves 12av adjacent to the groove width of the circumferential groove 12cv are axially alternately formed on the outside periphery of the central cylindrical part 12a of the counter gear shaft 12.

Spring bearers 12d in the shape of an axially long ellipse and slightly recessed along the circumferential groove 12cv are formed in two locations circumferentially apart at the bottom of the long rectangular recessed portion 12p.

In addition, a pin hole 12h is diametrically bored up to the cam guide groove 12g on the circumferential groove 12cv in the thick part between the short rectangular recessed portion 12q and the axial groove 12av.

More specifically, the pin hole 12h is bored in the radial direction of the cam guide grooves 12g circumferentially carved in four locations from the inside periphery of the hollow counter gear shaft 12.

Four pin holes 12h are formed on each circumferential groove 12cv.

A compression spring 22 elliptically wound is provided to the spring bearer 12d with its end fitted.

A pin 23 is slidably fitted into the pin hole 12h.

As one regulating rod E (F) and two cam rods C in a state in which the two cam rods hold one regulating rod are slidably fitted into each cam guide groove 12g in a bundle, an end on the central side of the pin 23 fitted into the pin hole 12h is touched from a cam face of the corresponding cam rod C to the outside periphery of the regulating rod E (F), when the cam groove v and the cutout e (f) correspond to the pin hole 12h by the movement of the cam rods C and the regulating rod E (F), the pin 23 falls in the cam groove v and the cutout e (f), when a sliding face except the cam groove v and the outside periphery except the cutout e (f) correspond, the pin runs on the sliding face and on the outside periphery, and the pin advances and retreats by the movement of the cam rods C and the regulating rod E (F).

The advance and the retreat of the pin 23 in the pin hole 12h define the entrance and the exit of an end on the centrifugal side to/from the bottom of the circumferential groove 12cv.

A swingable pawl R is buried in the long rectangular recessed portion 12p, the short rectangular recessed portion 12q and the circumferential groove 12cv communicating with both recessed portions respectively formed on the outside periphery of the central cylindrical part 12a of the counter gear shaft 12 having the above-mentioned structure, and a journaling pin 26 that swingably journals the swingable pawl R is buried in the axial groove 12av.

Figure 13:
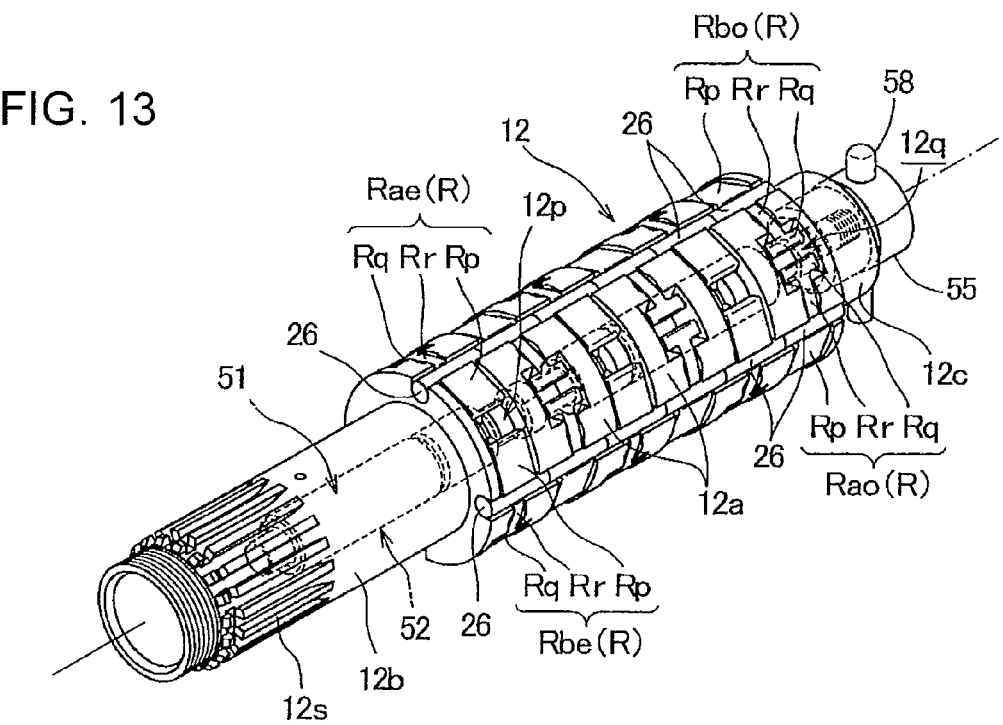
FIG. 13 is a perspective view showing a state in which a part of shift driving means and fitting means are mounted on the control rod.

FIG. 13 shows a state in which as described above, all swingable pawls R are mounted.

Figure 12:
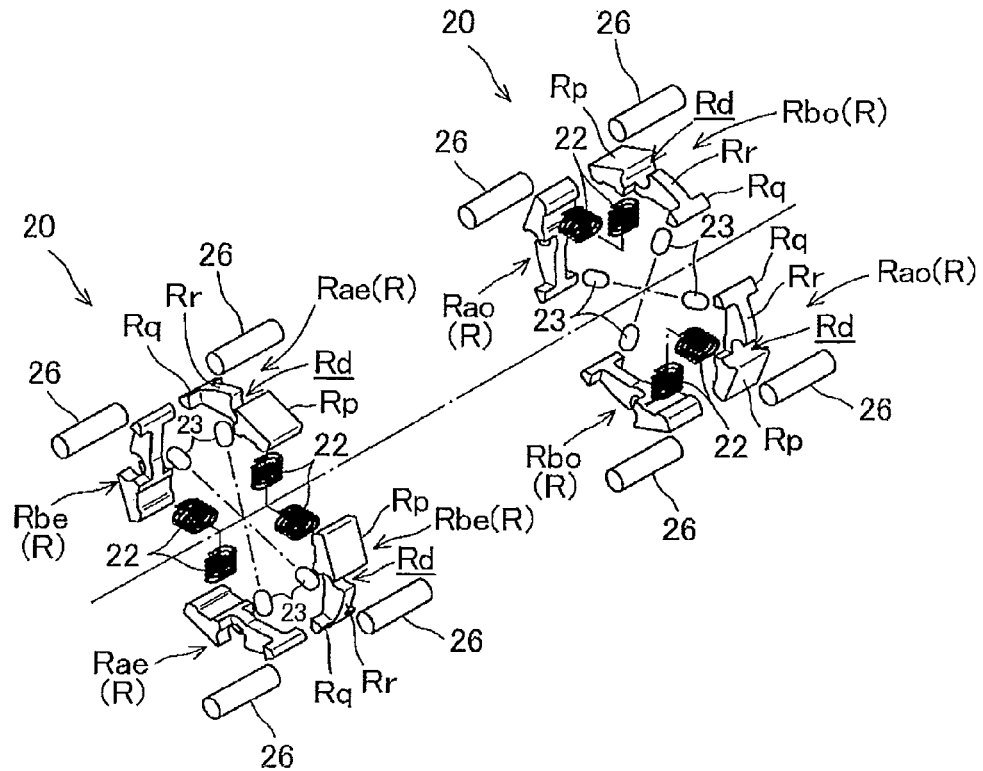
FIG. 12 is an exploded perspective view showing a swingable pawl, a journaling pin, the pin and the spring.

An exploded perspective view in FIG. 12 shows the four swingable pawls R buried in the circumference groove 12cv, the long rectangular recessed portion 12p and the short rectangular recessed portion 12q respectively corresponding to the odd-numbered gears (the first, third, fifth driven transmission gears n1, n3, n5) and the four swingable pawls R buried in the circumferential groove 12cv, the long rectangular recessed portion 12p and the short rectangular recessed portion 12q respectively corresponding to the even-numbered gears (the second, fourth, sixth driven transmission gears n2, n4, n6) in positions in which mutual relative angular positional relation is maintained. In addition, the exploded perspective view also shows the journaling pins 26 that journals each swingable pawl R, the compression springs 22 that act on each swingable pawl R and the pins 23.

All the swingable pawls R have the same shape, are substantially in the shape of a circular arc in an axial view, the outside periphery of a through hole for the journaling pin 26 to pierce is removed in the center of the swingable pawl and a bearing recessed portion Rd is formed, a wide rectangular fitting pawl member Rp is formed on one side with the bearing recessed portion Rd in the center of a swing, a narrow pin bearer Rr extends on the other side, and a wide end Rq is formed at the end of the pin bearer.

As for the swingable pawl R, the pin bearer Rr is swingably fitted into the circumferential groove 12cv in which the pin hole 12h is formed. One fitting pawl member Rp is swingably fitted into the long rectangular recessed portion 12p, the bearing recessed portion Rd is matched with the axial groove 12av, and the other wide end Rq is fitted into the short rectangular recessed portion 12q.

The journaling pin 26 is fitted into the matched bearing recessed portion Rd and axial groove 12av.

The swingable pawl R is symmetrically formed in relation to the fitted circumferential groove 12cv, one wide rectangular fitting pawl member Rp is heavier than the other pin bearer Rr and the wide end Rq, when the swingable pawl is turned together with the counter gear shaft 12 with the swingable pawl journaled by the journaling pin 26, the fitting pawl member Rp acts as a weight against centrifugal force, and the fitting pawl member swings the swingable pawl R so that the swingable pawl projects in a centrifugal direction.

The swingable pawl R is formed so that the width of the pin bearer Rr is narrower than that of the fitting pawl member Rp on the reverse side in relation to the center of a swing.

As the pin bearer Rr has only to have width enough to bear the pin 23, the swingable pawl R can be miniaturized and a swing by centrifugal force by the other fitting pawl member Rp can be facilitated.

As the swingable pawls R circumferentially adjacent are mounted on the counter gear shaft 12 in mutually symmetrical positions, the fitting pawl members Rp opposite at a predetermined interval are fitted into the common long rectangular recessed portion 12p and the other wide ends Rq mutually close are fitted into the common short rectangular recessed portion 12q.

The compression spring 22 one end of which is supported by the spring bearer 12d of the counter gear shaft 12 is inserted inside the fitting pawl member Rp of the swingable pawl R and the pin 23 fitted into the pin hole 12h is inserted between the cam rod C and the pin bearer inside the pin bearer Rr.

As described above, as the swingable pawl R is swingably journaled by the journaling pin 26, is buried in the long rectangular recessed portion 12p, the short rectangular recessed portion 12q and the circumferential groove 12cv respectively of the counter gear shaft 12, one fitting pawl member Rp is pressed outside by the compression spring 22 and the other pin bearer Rr is pressed by the advance and the retreat of the pin 23, the swingable pawl R is swung against the pressure of the compression spring 22 and centrifugal force by the fitting pawl member Rp.

When the pin 23 advances in the centrifugal direction and swings the swingable pawl R, the fitting pawl member Rp disappears in the long rectangular recessed portion 12p in the swingable pawl R and nothing projects outside from the outside periphery of the central cylindrical part 12a of the counter gear shaft 12.

When the pin 23 retreats, the fitting pawl member Rp which is pressed by the compression spring 22 and on which centrifugal force acts projects outside from the outside periphery of the central cylindrical part 12a of the counter gear shaft 12 and can be fitted to the driven transmission gear n.

As the compression spring 22 is inserted between the inside face of the fitting pawl member Rp of the swingable pawl R and the opposite long rectangular recessed portion 12p of the counter gear shaft 12, space dedicated for the spring is axially not required, the counter gear shaft 12 can be prevented from being axially large-sized, the compression spring 22 is arranged in the center of the axial width of the swingable pawl R and axial both sides of the swingable pawl R itself can be can be symmetrical. Therefore, two types of swingable pawls the fitting and the release of fitting of which are made in both directions of the relative rotational direction of the driven transmission gear n and the counter gear shaft 12 can have the same shape, and swingable pawls different in shape are not required to be prepared.

As the compression spring 22 is in the shape of an ellipse its longer diameter of which is along the axis of the counter gear shaft 12, the longer diameter of the elliptic compression spring 22 is larger than the width of the pin bearer Rr of the swingable pawl R and the compression spring is caught across the round circumferential groove 12cv into which the pin bearer Rr is swingably fitted. Thus, the working of the counter gear shaft 12 is facilitated and the swingable pawl R can be stably mounted on the counter gear shaft 12.

The four swingable pawls R corresponding to the odd-numbered gears (the first, third and fifth driven transmission gears n1, n3, n5) and the four swingable pawls R corresponding to the even-numbered gears (the second, fourth and sixth driven transmission gears n2, n4, n6) are located in the relative angular positional relation in which they are mutually turned by 90 degrees with the shaft in the center.

As for the four swingable pawls R corresponding to the odd-numbered gears (the first, third and fifth driven transmission gears n1, n3, n5), a pair of swingable pawls Rao for normal rotation and odd-numbered speeds which abut in a direction of the normal rotation of the gears and which are fitted so that each odd-numbered driven transmission gear n1, n3, n5 and the counter gear shaft 12 are synchronously turned and a pair of the swingable pawl Rbo for reverse rotation and odd-numbered speeds which abut in a direction of the reverse rotation of the gears and which are fitted so that each odd-numbered driven transmission gear n1, n3, n5 and the counter gear shaft 12 are synchronously turned are provided in symmetrical positions.

Similarly, as for the four swingable pawls R corresponding to the even-numbered gears (the second, fourth and sixth driven transmission gears n2, n4, n6), a pair of swingable pawls Rae for normal rotation and even-numbered speeds which abut in the direction of the normal rotation of the gears and which are fitted so that each even-numbered driven transmission gear n2, n4, n6 and the counter gear shaft 12 are synchronously turned and a pair of swingable pawl Rbe for reverse rotation and even-numbered speeds which abut in the direction of the reverse rotation of the gears and which are fitted so that each even-numbered driven transmission gear n2, n4, n6 and the counter gear shaft 12 are synchronously turned are in symmetrical positions.

The swingable pawl Rao for normal rotation and even-numbered speed is swung by the pin 23 that advances and retreats by the movement of the cam rod Cao for normal rotation and odd-numbered speed and the swingable pawl Rbo for reverse rotation and odd-numbered speed is swung by the pin 23 that advances and retreats by the movement of the cam rod Cbo for reverse rotation and odd-numbered speed.

Similarly, the swingable pawl Rae for normal rotation and even-numbered speed is swung by the pin 23 that advances and retreats by the movement of the cam rod Cae for normal rotation and even-numbered speed and the swingable pawl Rbe for reverse rotation and even-numbered speed is swung by the pin 23 that advances and retreats by the movement of the cam rod Cbe for reverse rotation and even-numbered speed.

When the fitting means 20 is built in the counter gear shaft 12, the bearing collar 13 at the right end is first armored at an outside end of the central cylindrical part 12a, one end of the journaling pin 26 is fitted into the axial groove 12av inside the bearing collar 13, the fitting means 20 at the right end is built in, the next fitting means 20 is built in as the last fitting means after the next bearing collar 13 is armored to cover the other end of the journaling pin 26, the bearing collar 13 at the left end is finally armored by sequentially repeating the above-mentioned steps, and all the steps are finished.

Figure 14:
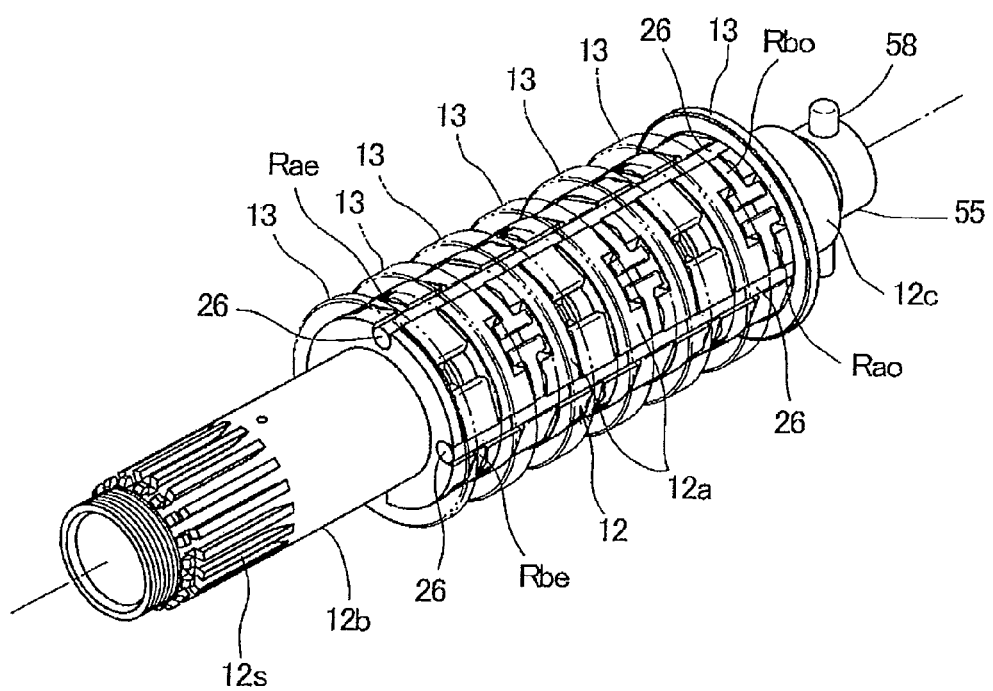
FIG. 14 is a perspective view showing a state in which a bearing collar is armored on the counter gear shaft in a state shown in FIG. 13.

As shown in FIG. 14, the bearing collars 13 are armored in axial positions except the long rectangular recessed portion 12p and the short rectangular recessed portion 12q respectively of the central cylindrical part 12a and each bearing collar is arranged across each journaling pin 26 and its adjacent journaling pin 26 which are buried in the axial groove 12av continuously in a line so as to prevent the journaling pin 26 and the swingable pawl R from falling.

As the journaling pin 26 buried in the axial groove 12av of the central cylindrical part 12a of the counter gear shaft 12 is buried in depth in contact with the outside periphery of the central cylindrical part 12a, the journaling pin is firmly fixed when the bearing collar 13 is armored.

The fitting pawl members Rp of the swingable pawl Rao for normal rotation and odd-numbered speed (the swingable pawl Rae for normal rotation and even-numbered speed) and the swingable pawl Rbo for reverse rotation and odd-numbered speed (the swingable pawl Rbe for reverse rotation and even-numbered speed) extend on mutually opposite sides, the swingable pawl Rao for normal rotation and odd-numbered speed (the swingable pawl Rae for normal rotation and even-numbered speed) is touched and fitted to a fitting projection portion 31 in a direction of the normal rotation of the driven transmission gear n (and the counter gear shaft 12), and the swingable pawl Rbo for reverse rotation and odd-numbered speed (the swingable pawl Rbe for reverse rotation and even-numbered speed) is touched and fitted to the fitting projection portion 31 in a direction of the reverse rotation of the driven transmission gear n.

The swingable pawl Rao for normal rotation and odd-numbered speed (the swingable pawl Rae for normal rotation and even-numbered speed) is not fitted even if the fitting pawl member Rp projects outside when the driven transmission gear n is turned in a reverse direction. Similarly, the swingable pawl Rbo for reverse rotation and odd-numbered speed (the swingable pawl Rbe for reverse rotation and even-numbered speed) is not fitted even if the fitting pawl member Rp projects outside when the driven transmission gear n is normally turned.

When the cam rods C are located in a neutral position, all the driven transmission gears n are in a fitting released state that the pin 23 located in a position in which the cam rod C of the corresponding fitting means 20 is moved and project, the pin bearer Rq of the swingable pawl R is pushed up from the inside and the fitting pawl member Rp is drawn inside, and the driven transmission gears are freely turned on the counter gear shaft 12.

In the meantime, in a fitting enabled state wherein the pin 23 located in a position except the neutral position in which the cam rod C of the fitting means 20 is moved enters the cam groove v (and the cutout e, f of the regulating rod E, F), the swingable pawl R is swung and the fitting pawl member Rp projects outside, the fitting projection portion 31 of the corresponding driven transmission gear n is touched to the fitting pawl member Rp and the turning of the corresponding drive transmission gear n is transmitted to the counter gear shaft 12 or the rotation of the counter gear shaft 12 is transmitted to the corresponding driven transmission gear n.

In the shift driving means 50, the shift drum 67 is turned by a predetermined quantity by the manual operation of the shift select lever, the turning of the shift drum 67 axially moves the control rod 51 by a predetermined quantity via the shift pin 58 fitted into the shift groove 67v, and the eight cam rods Cao, Cao, Cae, Cae, Cbo, Cbo, Cbe, Cbe of the fitting means 20 are interlocked via the lost motion mechanisms 52, 53.

When the cam rods C (and the regulating rod E, F) are axially moved, the pin 23 slidingly touched to the cam face of the cam rod C enters and exits from the cam groove v, advances and retreats, as a result, the swingable pawl R is swung, the fitting to the driven transmission gear n is released, the swingable pawl R is fitted to another driven transmission gear n, and a shift is executed by changing the driven transmission gears n fitted to the counter gear shaft 12.

The power of the internal combustion engine is transmitted to the main gear shaft 11 via the friction clutch 5, the first, second, third, fourth, fifth and sixth driving transmission gears m1, m2, m3, m4, m5, m6 are integrally turned, and the first, second, third, fourth, fifth and sixth driven transmission gears n1, n2, n3, n4, n5, n6 respectively constantly engaged with these driving transmission gears are turned at a respective revolution speed.

Figure 4:
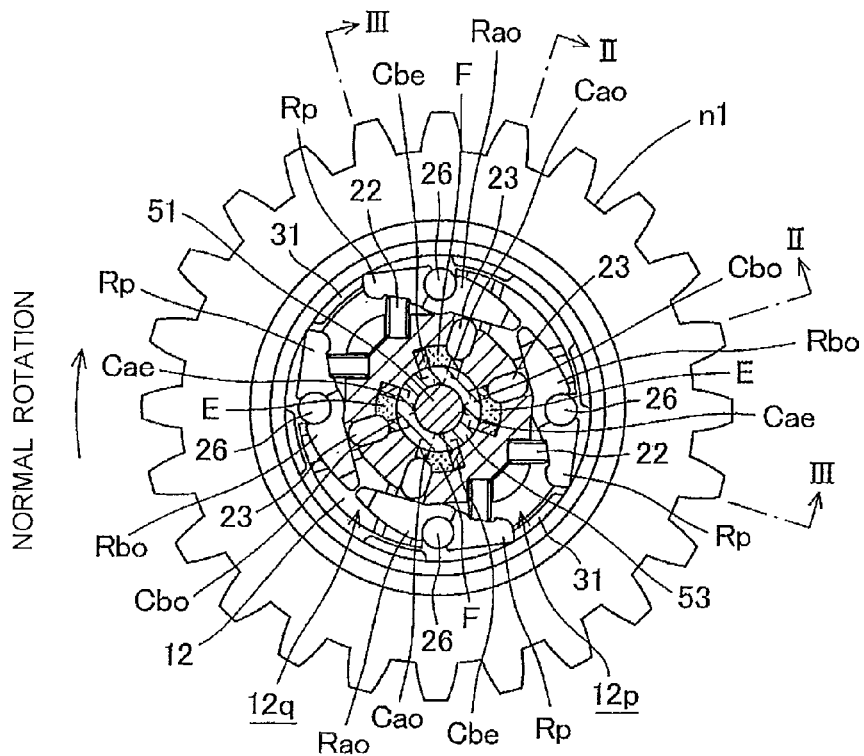
FIG. 4 is a sectional view viewed along a line IV-IV in FIGS. 2 and 3.
Figure 5:
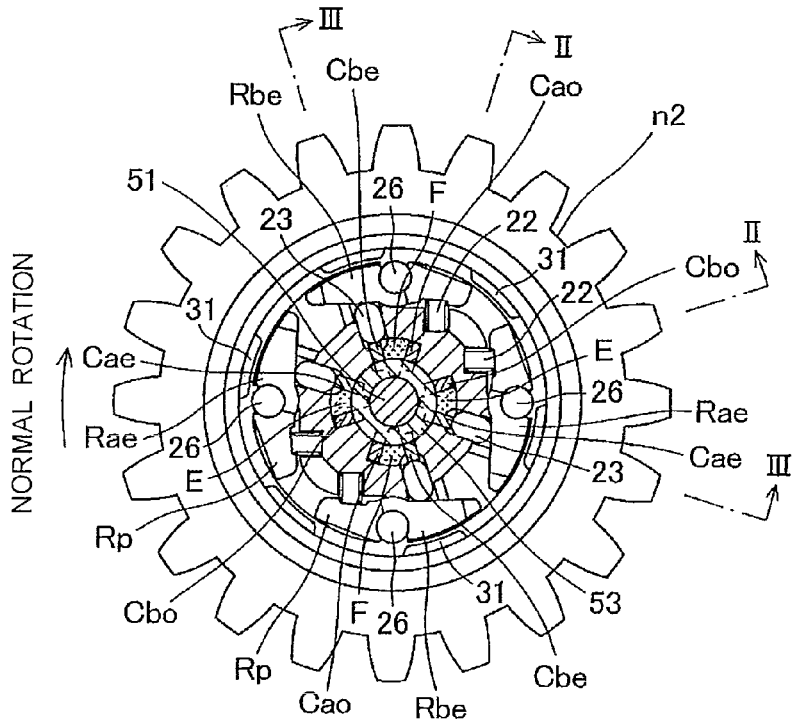
FIG. 5 is a sectional view viewed along a line V-V in FIGS. 2 and 3.

FIGS. 2 to 5 show a state of the first speed, in FIG. 4, the first driven transmission gear n1 is turned in a direction shown by an arrow, in FIG. 5, the second driven transmission gear n2 is turned in a direction shown by an arrow, and the second driven transmission gear n2 is turned at higher speed than the first driven transmission gear n1.

Figure 15:
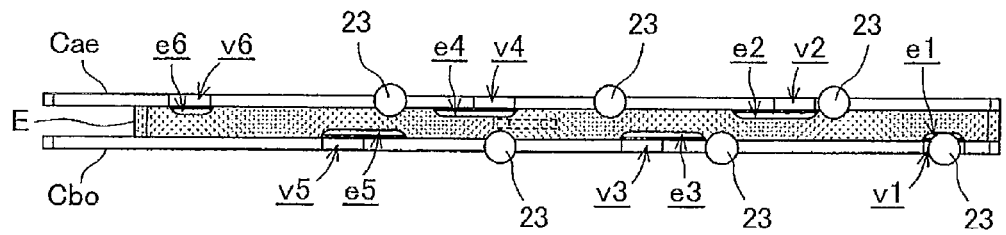
FIG. 15 is an explanatory drawing showing positional relation among the cam rod, the regulating rod and the pin in an accelerated state of first speed.

FIG. 15 is an explanatory drawing showing positional relation among the cam rods Cae, Cbo, Cao, Cbe, the regulating rods E, F and the pins 23 in an accelerated state of the first speed (a state in which the power from the internal combustion engine is transmitted).

To shift to higher speed, the control rod 51 is required to be moved to the right, to shift to lower speed, the control rod 51 is required to be moved to the left, the regulating rods E, F are integrally moved by the movement of the control rod 51, and the cam rods Cae, Cbo, Cao, Cbe are also interlocked via the lost motion mechanisms 52, 53.

As shown in FIG. 15, in a state in which the first speed is established, the cutouts e2, e4 of the regulating rod E corresponding to the cam grooves v2, v4 of the cam rod Cae for normal rotation and even-numbered speed are formed longer than the cam grooves v2, v4 in a leftward direction on the reverse side to a rightward direction which is a direction of the movement of the control rod 51 in a shift to higher speed.

Similarly, the cutouts f1, f3, f5 of the regulating rod F corresponding to the cam grooves v1, v3, v5 of the cam rod Cao for normal rotation and odd-numbered speed are formed longer than the cam grooves v1, v3, v5 in the leftward direction on the reverse side to the rightward direction which is the direction of the movement of the control rod 51 in the shift to higher speed.

In the meantime, the cutouts e3, e5 of the regulating rod E corresponding to the cam grooves v3, v5 of the cam rod Cbo for reverse rotation and odd-numbered speed are formed longer than the cam grooves v3, v5 in the rightward direction on the reverse side to the leftward direction which is a direction of the movement of the control rod 51 in a shift to lower speed, and the cutouts f2, f4, f6 of the regulating rod F corresponding to the cam grooves v2, v4, v6 of the cam rod Cbe for reverse rotation and even-numbered speed are formed longer than the cam grooves v2, v4, v6 in the rightward direction on the reverse side to the leftward direction which is the direction of the movement of the control rod 51 in the shift to lower speed.

More specifically, the cutout e1 and the cutout e6 of the regulating rod E have the substantially same short width as the corresponding cam groove v1 of the cam rod Cbo for reverse rotation and odd-numbered speed and the corresponding cam groove v6 of the cam rod Cae for normal rotation and even-numbered speed.

The regulating rods E, F and the cam rods C are relatively axially slid, however, the corresponding cam groove v of the cam rod C can be located in the width of each cutout of the regulating rods E, F.

The pin 23 the outside diameter of which is larger than the width of the cam rod C simultaneously also enters the cutout of the regulating rod E, F when the pin enters the cam groove v of the cam rod C.

In the accelerated state of the first speed shown in FIG. 15, each pin 23 enters the cam groove v1 of the cam rod Cao for normal rotation and odd-numbered speed and the cam groove v1 of the cam rod Cbo for reverse rotation and odd-numbered speed and simultaneously, each same pin 23 also enters the cutout e1 of the regulating rod E and the cutout f1 of the regulating rod F.

The other pins 23 are all touched to each sliding face of the cam rods C without falling in the cam grooves v of the cam rods C and all project.

More specifically, only the pins 23 of the fitting means 20 corresponding to the first driven transmission gear n1 enter the cam grooves v1 of the cam rods Cao, Cbo for odd-numbered speed (see FIG. 2), accordingly, the fitting pawl members Rp of the swingable pawls Rao, Rbo for odd-numbered speed of the fitting means 20 project outside, the fitting projection portion 31 of the turned first driven transmission gear n1 is fitted to the fitting pawl member Rp of the swingable pawl Rao for normal rotation and odd-numbered speed out of the swingable pawls Rao, Rbo for odd-numbered speed (see FIG. 4), and the counter gear shaft 12 is rotated at the same revolution speed as the first driven transmission gear n1 together with the first driven transmission gear n1.

In the accelerated state of the first speed, the second driven transmission gear n2 is idle because the pins 23 of the corresponding fitting means 20 exit from the cam grooves v2 of the cam rods Cae, Cbe for even-numbered speed and project (see FIG. 3) and the fitting pawl members Rp of the swingable pawls Rae, Rbe for even-numbered speed of the fitting means 20 are drawn inside.

The other third, fourth, fifth and sixth driven transmission gears n3, n4, n5, n6 are also similarly idle (see FIGS. 2 and 3).

It is the swingable pawl Rao for normal rotation and odd-numbered speed that is fitted to the fitting projection portion 31 of the first driven transmission gear n1 and transmits the power, as considerably large frictional resistance is caused when the swingable pawl Rao for normal rotation and odd-numbered speed that receives the power of the first driven transmission gear n1 is swung by the projection of the pin 23 so as to release the fitting, it is difficult to project the pin 23, and the pin 23 is in a state in which the pin falls in the cam groove v1 of the cam rod Cao for normal rotation and odd-numbered speed and the cutout f1 of the regulating rod F (see FIG. 15) and its outside end is held down by the swingable pawl Rao for normal rotation and odd-numbered speed.

Figure 16:
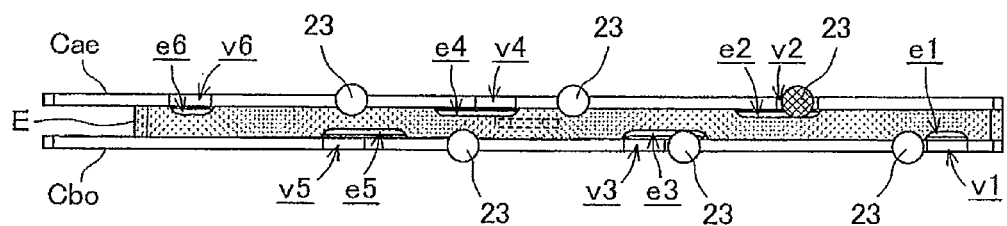
FIG. 16 is an explanatory drawing showing positional relation among the cam rod, the regulating rod and the pin in an accelerated state of second speed.
Figure 16:
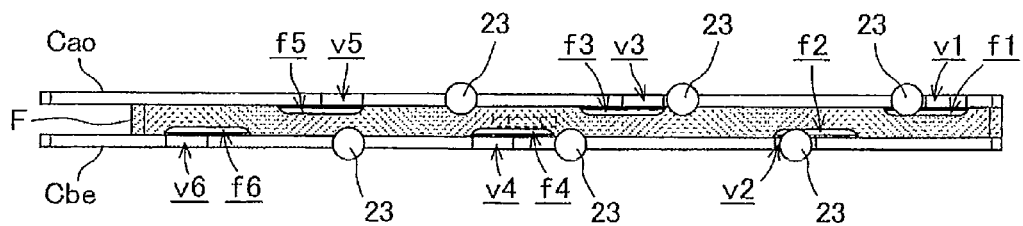

In FIGS. 15 and 16, the pin 23 in the state in which the projection is held down by the swingable pawl R is shown by lattice type of hatching.

The respective movement of the cam rod C where the pin 23 the protrusion of which is held down is located in the cam groove v and the regulating rod E, F where the pin is located in the cutout e, f is regulated by the pin 23.

Accordingly, in the accelerated state of the first speed shown in FIG. 15, the movement in both of the axial direction of the cam rod Cao for normal rotation and odd-numbered speed where the pin 23 the projection of which is held down is located in the cam groove v1 is regulated.

The movement of the regulating rod F where the same pin 23 is located in the cutout f1 is also regulated, however, as the cutout f1 is longer than the cam groove v1 and in the accelerated state of the first speed, the cutout f1 is longer leftward in the axial direction than the cam groove v1 as shown in FIG. 15, the rightward movement is allowed by predetermined distance though the leftward movement of the regulating rod F is regulated.

More specifically, the leftward movement of the control rod 51 connected to the regulating rod F via the cotter 80 is regulated, however, the rightward movement is allowed by the predetermined distance.

When the first speed is shifted to the second speed via the accelerated state, the shift drum 67 is turned by the manual operation of the shift select lever and the axial rightward movement of the control rod 51 is tried, however, as the rightward movement of the control rod 51 connected to the regulating rod F is allowed, the control rod can be easily moved rightward.

The manual operation of the shift select lever for slower speed from the accelerated state of the first speed is disenabled because the leftward movement of the control rod 51 is regulated.

When the control rod 51 is axially moved to the right from the accelerated state of the first speed, the axial rightward movement of the eight cam rods Cao, Cao, Cae, Cae, Cbo, Cbo, Cbe, Cbe in interlock via the coil springs 52s, 53s of the lost motion mechanisms 52, 53 is tried, however, as the swingable pawl Rao for normal rotation and odd-numbered speed operated via the pin 23 of the cam rod Cao for normal rotation and odd-numbered speed is fitted to the fitting projection portion 31 of the first driven transmission gear n1 and receives the power from the first driven transmission gear n1, considerably large frictional resistance is caused to swing the swingable pawl Rao for normal rotation and odd-numbered speed and to release the fitting, initially the swingable pawl is not immediately moved. Accordingly, the cam rod Cbe for reverse rotation and even-numbered speed also remains stopped, however, the cam rod Cae for normal rotation and even-numbered speed and the cam rod Cbo for reverse rotation and odd-numbered speed are moved without resistance.

The fitting pawl member Rp of the swingable pawl Rbo for reverse rotation and odd-numbered speed of the first speed is drawn inside by the movement of the cam rod Cbo for reverse rotation and odd-numbered speed.

The pin 23 enters the cam groove v2 by the movement of the cam rod Cae for normal rotation and even-numbered speed, accordingly, the swingable pawl Rae for normal rotation and even-numbered speed corresponding to the second driven transmission gear n2 is swung by the pressure of the compression spring 22 and centrifugal force by the fitting pawl member Rp, the fitting pawl member Rp projects outside and can be fitted to the second driven transmission gear n2, and a fitting projection portion 31 of the second driven transmission gear n2 turned at a higher speed than the counter gear shaft 12 rotated together with the first driven transmission gear n1 catches up with the fitting pawl member Rp projecting outside the swingable pawl Rae for normal rotation and even-numbered speed and is touched to it.

Immediately after, the counter gear shaft 12 starts to be rotated at the same revolution speed as the second driven transmission gear n2 by the second driven transmission gear n2 turned at higher speed, the fitting pawl member Rp of the swingable pawl Rao for normal rotation and odd-numbered speed is separated from the fitting projection portion 31 of the first driven transmission gear n1, and an actual shift from the first speed to the second speed is executed.

When the fitting pawl member Rp of the swingable pawl Rao for normal rotation and odd-numbered speed is separated from the fitting projection portion 31 of the first driven transmission gear n1, frictional resistance that fixes the swingable pawl Rao for normal rotation and odd-numbered speed gets lost, the cam rod Cao for normal rotation and odd-numbered speed pressed by the coil spring 53s of the lost motion mechanism 53 is rightward moved behind, the pin 23 located in the cam groove v1 gets out of the cam groove, the swingable pawl Rao for normal rotation and odd-numbered speed is swung, and the fitting pawl member Rp is drawn inside.

As described above, as the fitting projection portion 31 of the first driven transmission gear n1 is touched and fitted to the fitting pawl member Rp of the swingable pawl Rao for normal rotation and odd-numbered speed when the accelerated state of the first speed is shifted to the second speed the speed reducing ratio of which is smaller by one stage, the fitting projection portion 31 of the second driven transmission gear n2 turned at higher speed catches up with the fitting pawl member Rp of the swingable pawl Rae for normal rotation and even-numbered speed and is touched to it in a state in which the counter gear shaft 12 is rotated at the same speed as the first driven transmission gear n1, the counter gear shaft 12 is rotated at higher speed together with the second driven transmission gear n2 and the shift is executed, the fitting pawl member Rp of the swingable pawl Rao for normal rotation and odd-numbered speed is naturally separated from the fitting projection portion 31 of the first driven transmission gear n1, as the fitting is smoothly released, no power is required for releasing the fitting, and smooth operation and the smooth shift are enabled.

Also similarly in each shift from the second speed to the third speed, from the third speed to the fourth speed, from the fourth speed to the fifth speed and from the fifth speed to the sixth speed, as the driven transmission gear n the speed reducing ratio of which is smaller by one stage is fitted to the swingable pawl R in a state in which the driven transmission gear n is fitted to the swingable pawl R and a shift is executed, smooth operation is enabled without power to release the fitting, no clutch for the shift is required, no switching time is lost in the shift, no driving force is also lost, shift shock is also small, and the smooth shift can be executed.

Also similarly in a downward shift, as the swingable pawl R is fitted to the driven transmission gear n the speed reducing ratio of which is larger by one stage in a state in which the driven transmission gear n is fitted to the swingable pawl R and the downward shift is executed, no power for releasing the fitting is required, smooth operation is enabled, no clutch for the shift is required, no switching time is lost in the downward shift, no driving force is also lost, shift shock is also small, and smooth downward shift can be executed.

FIG. 16 shows positional relation among the cam rods C, the regulating rods E, F and the pins 23 in an accelerated state of the second speed, the pins 23 of the fitting means 20 corresponding to the second driven transmission gear n2 are located in the cam groove v2 of the cam rod Cae for normal rotation and even-numbered speed and the cam groove v2 of the cam rod Cbe for reverse rotation and even-numbered speed, and similarly, the same pins 23 are also located in the cutout e2 of the regulating rod E and the cutout f2 of the regulating rod F.

The other pins 23 are all located in no cam groove v of the cam rods C, are touched to a sliding face of each cam rod C, and project.

It is the swingable pawl Rae for normal rotation and even-numbered speed that is fitted to the fitting projection portion 31 of the second driven transmission gear n2 and transmits the power, and an outside end of the pin 23 (the pin 23 shown by lattice type of hatching in FIG. 16) that operates the swingable pawl Rae for normal rotation and even-numbered speed is held down by the swingable pawl Rae for normal rotation and even-numbered speed in a state in which the pin falls in the cam groove v2 of the cam rod Cae for normal rotation and even-numbered speed and the cutout e2 of the regulating rod E.

Accordingly, the movement in both of the axial direction of the cam rod Cae for normal rotation and even-numbered speed where the pin 23 the projection of which is held down is located in the cam groove v2 is regulated.

The movement of the regulating rod E in the cutout e2 of which the same pin 23 is located is also regulated, however, as the cutout e2 is longer than the cam groove v2 and is longer leftward in the axial direction than the corresponding cam groove v2 as shown in FIG. 16 in the second speed, the leftward movement of the regulating rod E is regulated, however, the rightward movement is allowed by predetermined distance.

More specifically, the leftward movement of the control rod 51 connected to the regulating rod E is regulated, however, the rightward movement is allowed by predetermined distance.

Accordingly, when the shift select lever is manually operated to shift to the third speed in an accelerated state from the second speed, smooth operation is enabled because the rightward movement of the control rod 51 is allowed and a shift to the third speed can be executed.

However, when a downward shift to the first speed is tried in the accelerated state of the second speed, the control rod cannot be moved because the leftward movement of the control rod 51 is regulated by the pin 23 even if the shift select lever is manually operated and the axial leftward movement of the control rod 51 is tried and accordingly, the manual operation itself of the shift select lever is regulated.

As a state in which the second driven transmission gear n2 is fitted to the cam rod Cae for normal rotation and even-numbered speed is originally maintained in the accelerated state of the second speed, the first driven transmission gear n1 the turning of which is slower than the second driven transmission gear n2 is not fitted to the cam rod Cae for normal rotation and even-numbered speed even if the operation for a downward shift is made. Accordingly, a shift to the first speed in a state in which a fitted state of the second speed is maintained is disenabled.

As described above, as the control rod 51 could be hitherto moved leftward and the shift select lever could be operated without being regulated though a downward shift is disenabled in the accelerated state, a driver (a rider) might have a sense of incompatibility.

Even if a downward shift is made during acceleration, nothing happens, however, the downward shift happens in afterward deceleration and a driver (a rider) also might have a sense of incompatibility for the motion.

To avoid such a situation, in the case of this multistage transmission, as the manual operation itself for a downward shift in the accelerated state of the shift select lever is regulated, a driver (a rider) does not have a sense of incompatibility.

Figure 17:
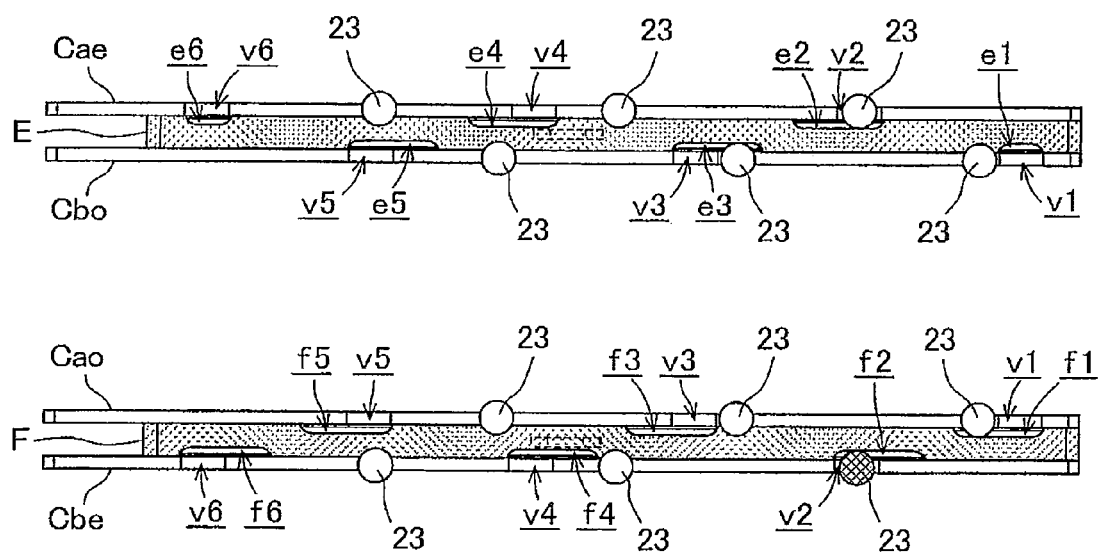
FIG. 17 is an explanatory drawing showing positional relation among the cam rod, the regulating rod and the pin in a decelerated state of the second speed.

FIG. 17 shows a state in which the second speed is decelerated (a state in which power is transmitted from the side of a driving wheel) and compared with the accelerated state of the second speed shown in FIG. 16, the pin 23 to which lattice type of hatching is applied is different.

More specifically, it is the swingable pawl Rbe for reverse rotation and even-numbered speed that transmits the power from the side of the driving wheel (the counter gear shaft 12) to the second driven transmission gear n2, and an outside end of the pin 23 (the pin 23 shown by lattice type of hatching in FIG. 17) that operates the swingable pawl Rbe for reverse rotation and even-numbered speed is held down by the swingable pawl Rbe for reverse rotation and even-numbered speed in a state in which the pin is located in the cam groove v2 of the cam rod Cbe for reverse rotation and even-numbered speed and the cutout 12 of the regulating rod F.

Accordingly, the movement of the regulating rod F where the pin 23 projection of which is held down is located in its cutout f2 is regulated, however, as the cutout f2 is longer than the cam groove v2 and the cutout 12 is longer to the right in the axial direction than the corresponding cam groove v2 as shown in FIG. 17 in a state of the second speed, the leftward movement of the regulating rod is allowed by predetermined distance though the rightward movement of the regulating rod F is regulated.

More specifically, the rightward movement of the control rod 51 connected to the regulating rod F is regulated, however, the leftward movement is allowed by predetermined distance.

Accordingly, when the shift select lever is manually operated to shift from the second speed to the first speed in deceleration, a smooth operation is enabled because the leftward movement of the control rod 51 is allowed and the second speed can be shifted to the first speed.

However, even if the shift select lever is manually operated and the axial rightward movement of the control rod 51 is tried so as to shift to the third speed in a decelerated state of the second speed, the control rod cannot be moved because the rightward movement of the control rod 51 is regulated by the pin 23 and accordingly, the manual operation itself of the shift select lever is regulated.

The first speed and the second speed have been described above, however, other speeds are also similar and as to a downward shift in acceleration and an upward shift in deceleration in a state in which certain speed is established, a driver (a rider) is prevented from having a sense of incompatibility by regulating the driver's (the rider's) operation itself for the shift and disenabling the operation.

As each regulating rod E, F, the cam rod C for normal rotation and the cam rod C for reverse rotation are bundled with the regulating rod axially slidably held between the cam rod C for normal rotation and the cam rod C for reverse rotation and are fitted into the cam guide groove 12g of the counter gear shaft 12 in a bundled state, a guide groove 12g is not required to be respectively provided and a man-hour for working the counter gear shaft 12 can be reduced.

Each cutout e, f corresponding to the cam grooves v of the two cam rods C for normal rotation and for reverse rotation can be provided to each regulating rod E, F and the number of parts can be reduced.

As the regulating rods E, F are formed by a separate member from the control rod 51 and are connected to the control rod 51 to enable the integral movement with the control rod by connecting means of the cotter 80, the regulating rods E, F and the control rod 51 are separately formed and can be more easily worked than a case that the regulating rods E, F and the control rod 51 are integrated.

Referring to FIGS. 18 to 32, an embodiment of this invention will be described below.

A multistage transmission 110 equivalent to this embodiment is built in an internal combustion engine mounted in a motorcycle.

Figure 18:
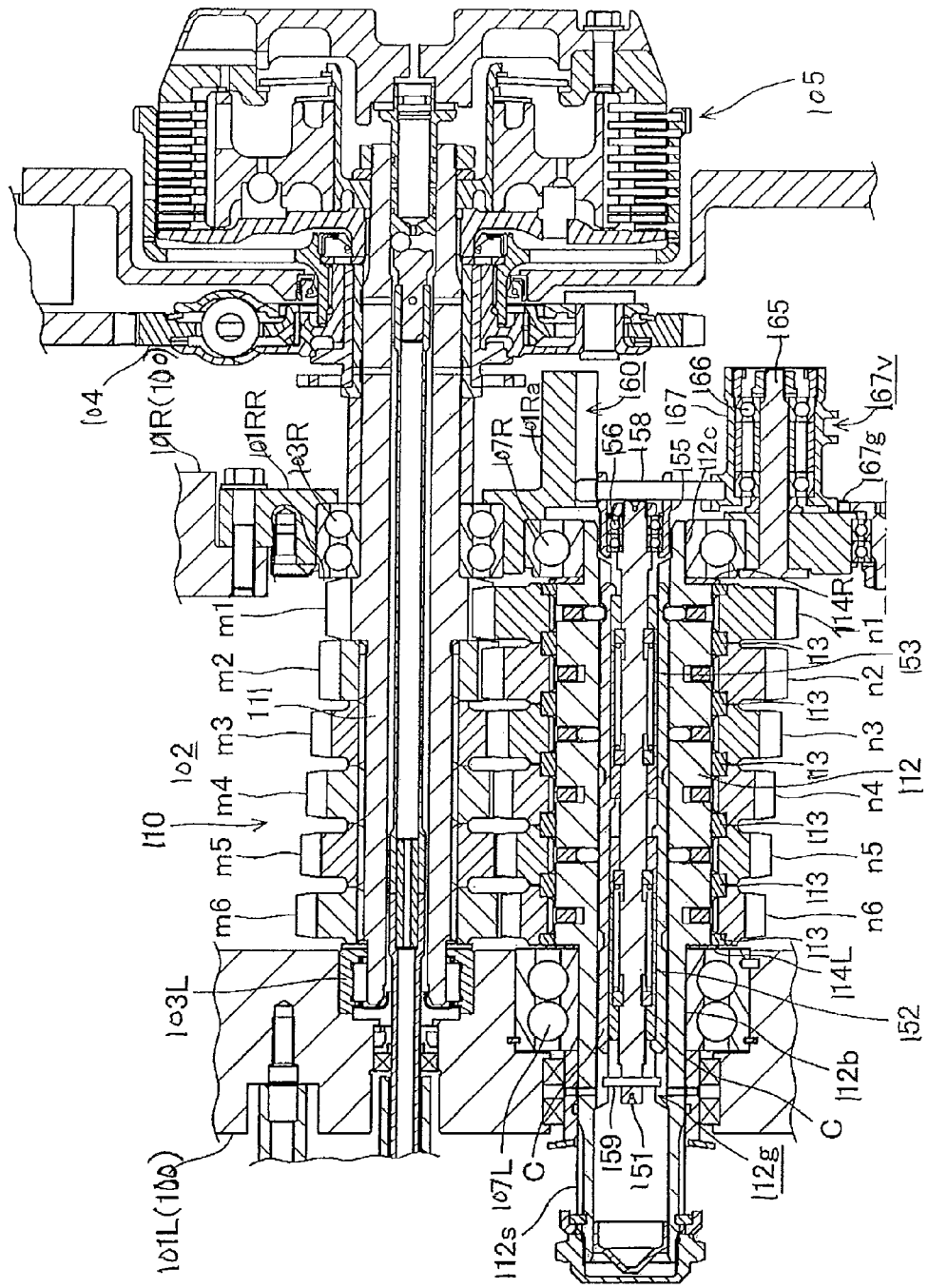
FIG. 18 is a sectional view showing a multistage transmission equivalent to an embodiment of this invention.

FIG. 18 is a sectional view showing the multistage transmission 110 and as shown in FIG. 18, the multistage transmission 110 is provided to an engine casing 100 that also covers the internal combustion engine.

The engine casing 100 configured by uniting a left engine casing 101L and a right engine casing 101R respectively laterally divided forms a transmission chamber 102, and a main gear shaft 111 and a counter gear shaft 112 are rotatably journaled to the transmission chamber 102 with the gear shafts laterally laid mutually in parallel.

The main gear shaft 111 is rotatably journaled to a side wall of the left engine casing 101L and a side wall 101RR of the right engine casing 101R via each bearing 103L, 103R and pierces the right bearing 103R, and a multi-disc type friction clutch 105 is provided to its right end protruded from the transmission chamber 102.

A primary driven gear 104 to which the rotation of a crankshaft not shown is transmitted is rotatably journaled to the main gear shaft 111 on the left side of the friction clutch 105.

The rotation of the crankshaft of the internal combustion engine is transmitted to the main gear shaft 111 via the friction clutch 105 in a connected state from the primary driven gear 104.

In addition, the counter gear shaft 112 is also rotatably journaled to a side wall of the left engine casing 101L and a side wall 101RR of the right engine casing 101R via bearings 107L, 107R and an output sprocket (not shown) is fixed via splines at a left end piercing the left bearing 107L and protruded from the transmission chamber 102.

A driving chain wound onto the output sprocket is wound onto a sprocket for driving a rear wheel not shown, the rotational power of the counter gear shaft 112 is transmitted to the rear wheel, and a vehicle is operated.

A group m of driving transmission gears is formed between the left and right bearings 103L, 103R on the main gear shaft 111 so that the group can be turned integrally with the main gear shaft 111.

The first driving transmission gear m1 is integrated with the main gear shaft 111 along the right bearing 103R, and second, third, fourth, fifth and sixth driving transmission gears m2, m3, m4, m5, m6 each diameter of which is sequentially increased in order from the right to the left are fitted to a spline formed between the first driving transmission gear m1 of the main gear shaft 111 and the left bearing 103L via each spline.

In addition, a group n of driven transmission gears is turnably journaled to the counter gear shaft 112 between the left and right bearings 107L, 107R via each annular bearing collar 113.

On the counter gear shaft 112, the five bearing collars 113 are armored at an equal interval between the bearing collar 113 at its right end armored via a washer 114R mounted on the left side of the right bearing 107R and the bearing collar 113 at its left end armored via a washer 114L mounted on the right side of the left bearing 107L, and first, second, third, fourth, fifth and sixth driven transmission gears n1, n2, n3, n4, n5, n6 each diameter of which is sequentially decreased in order from the right to the left with each driven transmission gear mounted between the adjacent bearing collars 113 of all the seven bearing collars 113 are turnably journaled.

The first, second, third, fourth, fifth and sixth driving transmission gears m1, m2, m3, m4, m5, m6 turned integrally with the main gear shaft 111 are respectively constantly engaged with the corresponding first, second, third, fourth, fifth and sixth driven transmission gears n1, n2, n3, n4, n5, n6 respectively turnably journaled to the counter gear shaft 112.

The engagement of the first driving transmission gear m1 and the first driven transmission gear n1 produces first speed the speed reducing ratio of which is the largest, the engagement of the sixth driving transmission gear m6 and the sixth driven transmission gear n6 produces sixth speed the speed reducing ratio of which is the smallest, the speed reducing ratio is sequentially decreased between them, and second speed, third speed, fourth speed and fifth speed are produced.

On the counter gear shaft 112, the gears for odd-numbered speeds (the first, third and fifth driven transmission gears n1, n3, n5) and the gears for even-numbered speeds (the second, fourth and sixth driven transmission gears n2, n4, n6) are alternately arranged.

Fitting means 120 fittable to each driven transmission gear n is built in the hollow cylindrical counter gear shaft 112 as described later, a total of four types of eight cam rods C (Cao, Cao, Cae, Cae, Cbo, Cbo, Cbe, Cbe) composed by two with every type of which are one component of the fitting means 120 as described later that are fitted into cam guide grooves 112g formed on an inside periphery of the hollow counter gear shaft 112 and described later, and the eight cam rods are axially movably provided.

A control rod 151 which is one component of shift driving means 150 that drives the cam rod C and shifts is inserted along a central axis of the hollow counter gear shaft 112 and the axial movement of the control rod 151 axially moves the cam rod C in interlock via lost motion mechanisms 152, 153.

A mechanism that axially moves the control rod 151 is provided to the right engine casing 101R.

The axial movement of the control rod 151 axially moves the cam rod C in interlock via the lost motion mechanism 152, 153, the movement of the cam rod C selectively fits each driven transmission gear n to the counter gear shaft 112 by the fitting means 120 built in the counter gear shaft 112, and speed is shifted.

Figure 23:
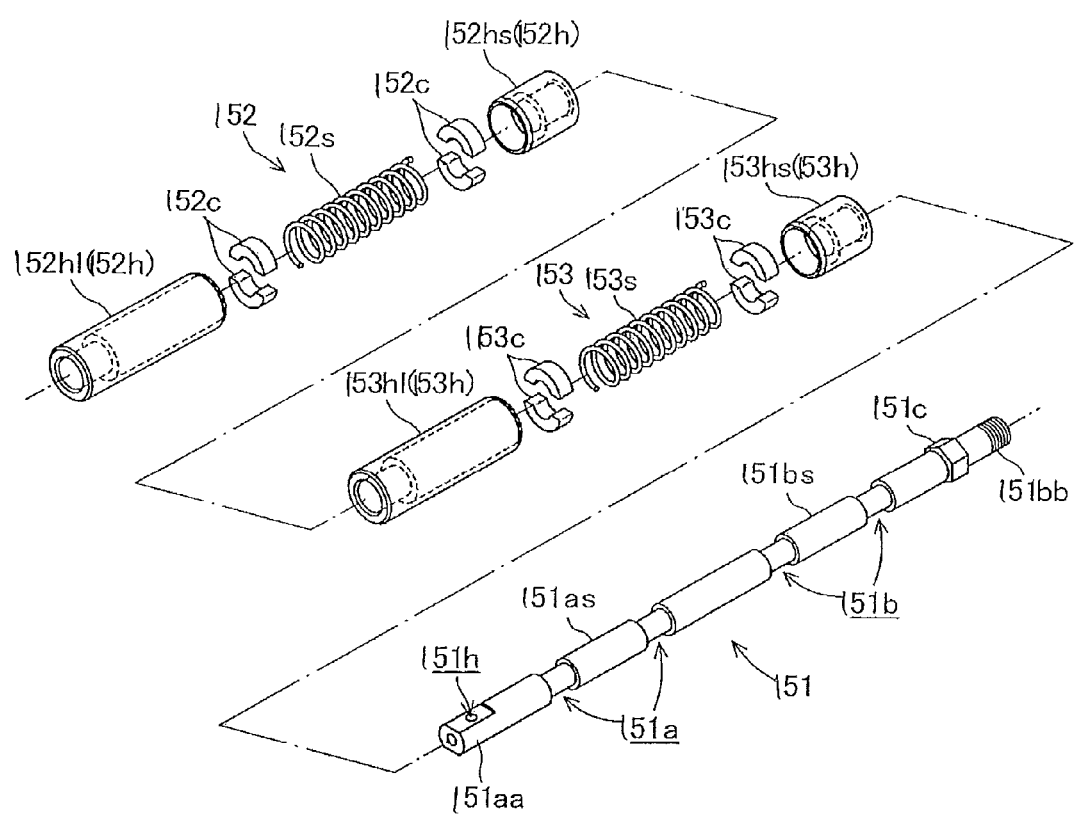
FIG. 23 is an exploded perspective view showing a control rod and a lost motion mechanism.

As shown in FIG. 23, the control rod 151 of the shift driving means 150 is a cylindrical rod, outside recessed portions 151a, 151b formed by reducing its diameter in left two locations and right two locations in an axial direction are formed by a predetermined length, and extended-diameter stopper parts 151as, 151bs the diameter of which extend are formed in the axial center of each outside recessed portion 151a, 151b.

The outside recessed portions 151a, 151b left on both sides of each extended-diameter stopper part 151as, 151bs have the same axial predetermined length and the outside diameter of each extended-diameter stopper part 151as, 151bs is substantially equal to the outside diameter of the control rod 151 except the outside recessed portions 151a, 151b.

A left end of the control rod 151 is a two-plane width cut-out end 151aa a part of a circular arc of which is cut out on a parallel plane and a pin hole 151h is bored at the two-plane width cut-out end 151aa with the pin hole piercing both planes.

A right end of the control rod 151 is made a male screw end 151bb where a male screw is formed and a hexagonal nut 151c is fitted inside the male screw end 151bb.

The lost motion mechanisms 152, 153 are correspondingly mounted on the left and right outside recessed portions 151a, 151b of the control rod 151.

The left and right lost motion mechanisms 152, 153 have the same structure.

As for the left lost motion mechanism 152, a spring holder 152h into which the control rod 151 is slidably inserted is formed by the coupling of a long holder 152hl which is a bottomed cylindrical member and a short holder 152hs and an inside recessed portion 152ha corresponding to the outside recessed portion 151a of the control rod 151 is formed on its inside face.

When the control rod 151 is made to pierce the spring holder 152h and the spring holder 152h is located in the outside recessed portion 151a, both space of the inside recessed portion 152ha of the spring holder 152h and the outside recessed portion 151a of the control rod 151 forms a common space.

A pair of right and left cotters 152c which are spring bearers are opposite fitted across both the space of the inside recessed portion 152ha of the spring holder 152h and the outside recessed portion 151a of the control rod 151. A compression coil spring 152s, wound onto the control rod 151, is inserted between both cotters 152c, and the compression coil spring presses both cotters 152c in directions in which both cotters are separated.

Figure 19:
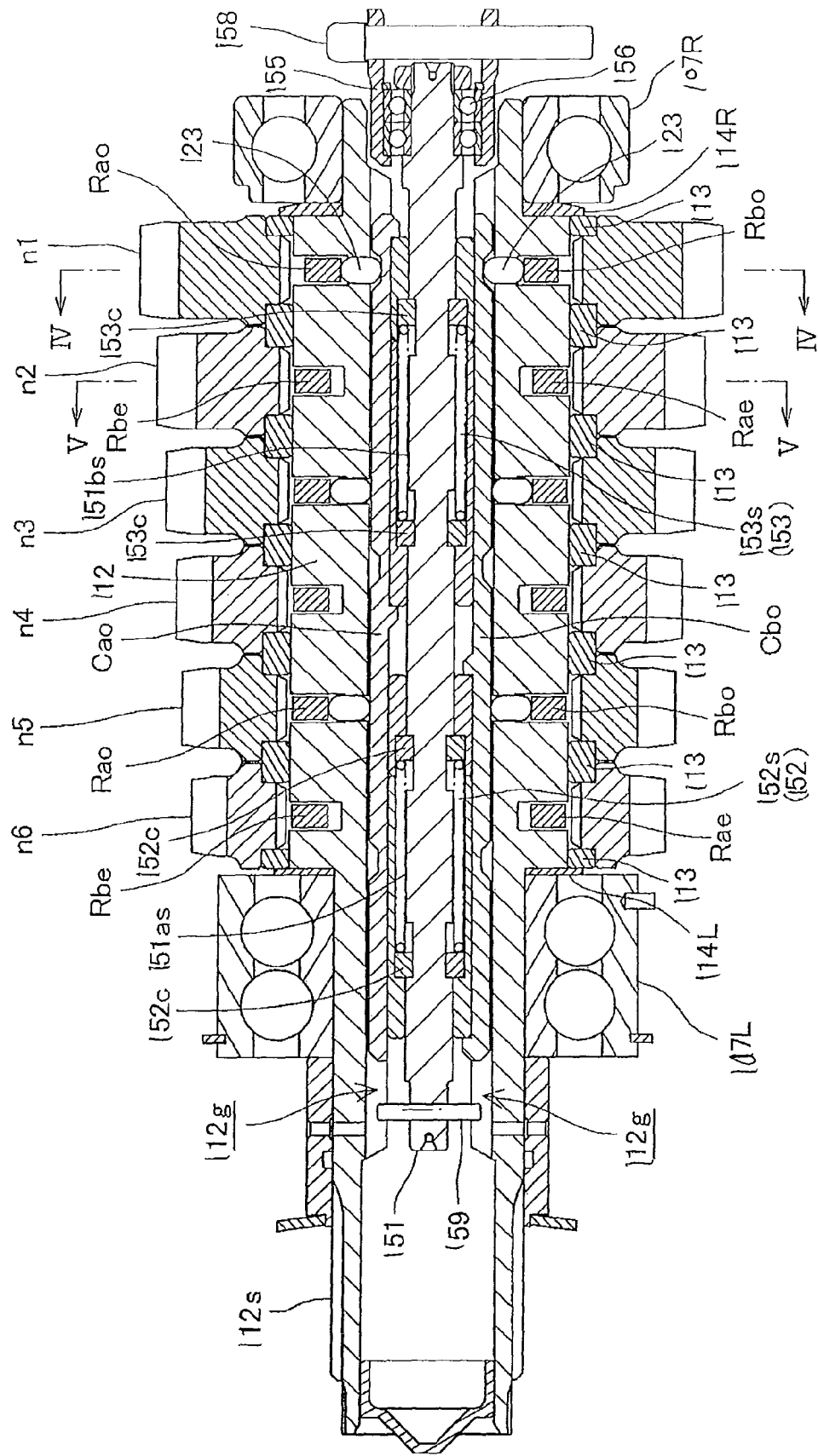
FIG. 19 is a sectional view showing a counter gear shaft and structure around it (a sectional view viewed along a line II-II in FIGS. 21 and 22)
Figure 20:
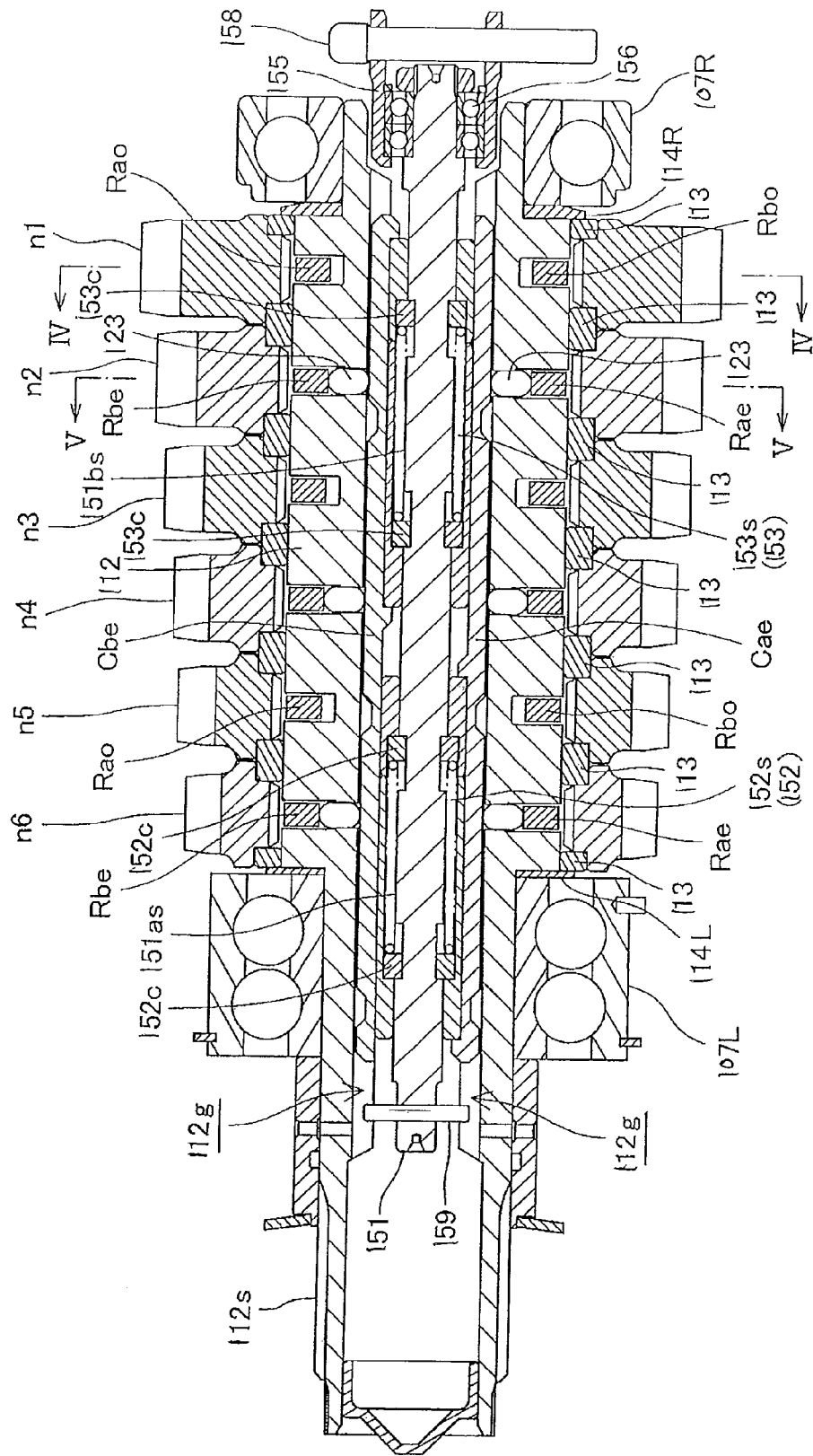
FIG. 20 is another sectional view showing the counter gear shaft and the structure around it (a sectional view viewed along a line in FIGS. 21 and 22)
Figure 21:
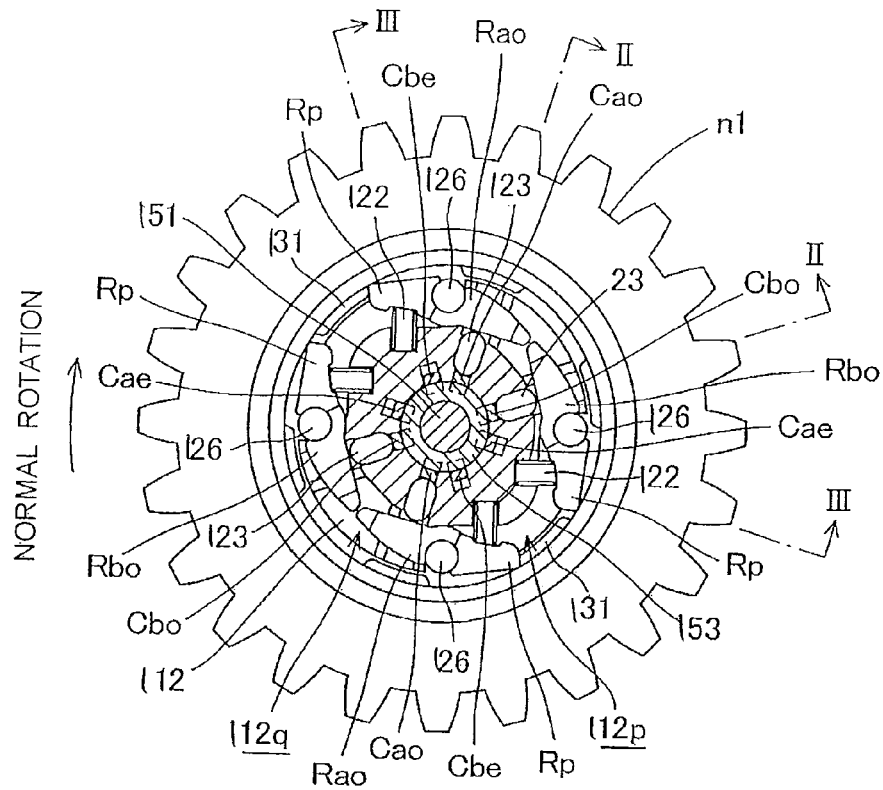
FIG. 21 is a sectional view viewed along a line IV-IV in FIGS. 19 and 20.
Figure 22:
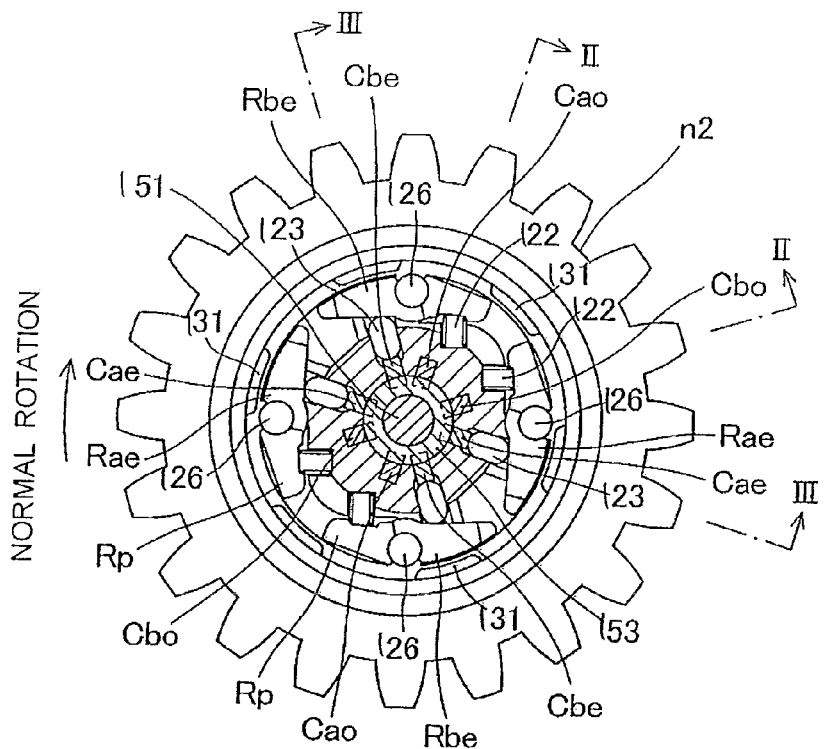
FIG. 22 is a sectional view viewed along a line V-V in FIGS. 19 and 20.

As shown in FIGS. 19 and 20, the extended-diameter stopper part 151as formed in the center of the outside recessed portion 151a of the control rod 151 is located between right and left cotters 152c and when a certain speed is established, the distance between the extended-diameter stopper part 151as of the control rod 151 and the cotter 152c on each side is equivalent to one stage of a shift.

The cotter 152c is in the shape of a hollow disc having an inside diameter of the inside recessed portion 152ha of the spring holder 152h as its outside diameter and having an outside diameter of the outside recessed portion 151a of the control rod 151 as its inside diameter, and the cotter is divided in halves for assembly.

The right lost motion mechanism 153 (a spring holder 153h, a long holder 153hl, a short holder 153hs, an inside recessed portion 153ha, a cotter 153c, a compression coil spring 153s) also has the same structure and is arranged in the outside recessed portion 151b of the control rod 151.

When a certain speed is established, the distance between an extended-diameter stopper part 151bs of the control rod 151 and the cotter 153c on each side is equivalent to one stage of the shift.

Accordingly, when the control rod 151 is axially moved by one stage of the shift, the spring holders 152h, 153h are axially moved via the compression coil springs 152s, 153s of the left and right lost motion mechanisms 152, 153.

When lost motion operation is tried over one stage of the shift, each extended-diameter stopper part 151as, 151bs of the control rod 151 abuts on one cotter 152c, 153c and the movement of the control rod 151 is regulated.

Figure 24:
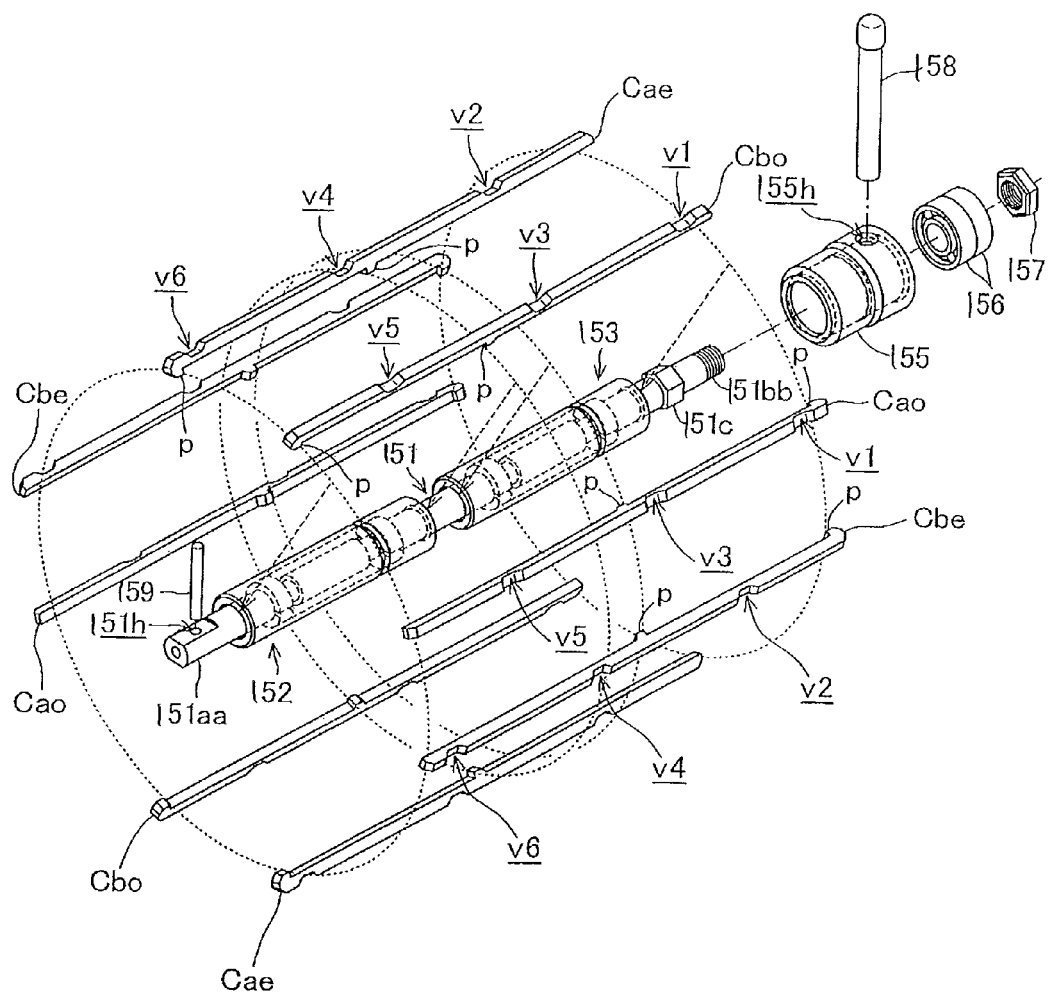
FIG. 24 is an exploded perspective view showing a state in which the lost motion mechanism is mounted on the control rod, cam rods and others.

The eight cam rods C (Cao, Cao, Cae, Cae, Cbo, Cbo, Cbe, Cbe) are radially touched to outside faces of the spring holders 152h, 153h of the lost motion mechanisms 152, 153 mounted in the left and right outside recessed portions 151a, 151b of the control rod 151 (see FIG. 24).

The cam rod C is a prism the section of which is rectangular and which is axially extended long, the peripheral side on the reverse side to the inner side touched to the spring holder 152h, 153h forms a cam face, a cam groove v is formed in required three locations on the cam face, and a pair of fitting pawls p for fitting either of the spring holders 152h, 153h with either held between the pair of fitting pawls are protruded from the inner side.

As the cam rod C has no section in a special shape and the outline is substantially the simple rectangular prism, the cam rod C can be easily manufactured.

The cam rods Cao, Cbo for odd-numbered speeds where the cam grooves v1, v3, v5 are formed in the three locations corresponding to the gears for odd-numbered speeds (the first, third and fifth driven transmission gears n1, n3, n5) have two types of a type for normal rotation (a rotational direction in which force is applied to the counter gear shaft 112 from the driven transmission gear n in acceleration) and a type for reverse rotation (a rotational direction in which force is applied to the counter gear shaft 112 from the driven transmission gear n in deceleration). One cam rod Cao for normal rotation and odd-numbered speed is provided with the fitting pawl p for fitting to the right spring holder 153h on the inner side and the other cam rod Cbo for reverse rotation and odd-numbered speed is provided with the fitting pawl p for fitting to the left spring holder 152h on the inner side (see FIG. 24).

Similarly, the cam rods Cae, Cbe for even-numbered speeds where the cam grooves v2, v4, v6 are formed in the three locations corresponding to the gears for even-numbered speeds (the second, fourth and sixth driven transmission gears n2, n4, n6) have two types of a type for normal rotation and a type for reverse rotation. One cam rod Cae for normal rotation and even-numbered speed is provided with the fitting pawl p for fitting to the left spring holder 152h on the inner side and the other cam rod Cbe for reverse rotation and even-numbered speed is provided with the fitting pawl p for fitting to the right spring holder 153h on the inner side (see FIG. 24).

Accordingly, the cam rod Cao for normal rotation and odd-numbered speed and the cam rod Cbe for reverse rotation and even-numbered speed are axially interlocked with the axial movement of the control rod 151 together with the spring holder 153h via the compression coil spring 153s of the right lost motion mechanism 153, and the cam rod Cbo for reverse rotation and odd-numbered speed and the cam rod Cae for normal rotation and even-numbered speed are axially interlocked together with the spring holder 152h via the coil spring 152s of the left lost motion mechanism 152.

As shown in FIG. 24, a control rod operating cylinder 155 is attached to a right end on the right side of the nut 151c of the control rod 151 via a ball bearing 156 fitted inside it.

As for the ball bearing 156, two ball bearings are axially coupled, the ball bearing is fitted to the right end on the right side of the nut 151c of the control rod 151, and the ball bearing is fastened by a nut 157 screwed to the male screw end 151bb with the ball bearing held between the nut 157 and the nut 151c.

Accordingly, the control rod operating cylinder 155 rotatably holds the right end of the control rod 151.

A pin hole 155h bored in a diametrical direction is formed in a cylindrical part extended on the right side of the screwed nut 157 of the control rod operating cylinder 155 and a shift pin 158 pierces the pin hole 155h.

A fitting pin 159 pierces the pin hole 151h formed at the two-plane width cut-out end 151aa at the left end of the control rod 151.

Both ends of the shift pin 158 that pierces the control rod operating cylinder 155 project as shown in FIG. 18.

A groove 160 is laterally formed in a guide part 101Ra projecting on the right side of a side wall 101RR of the right engine casing 101R and a projecting head at one end of the shift pin 158 is slidably fitted into the groove 160 so as to prevent the shift pin 158 from being turned.

A spindle 165 is planted in the side wall 101RR with the spindle projecting to the right, a shift drum 167 is turnably journaled to the spindle 165 via a bearing 166, and the projecting other end of the shift pin 158 is slidably fitted into a shift groove 167v of the shift drum 167.

The shift groove 167v of the shift drum 167 is spirally formed substantially around the outside periphery of the drum and a position of each shift stage from the first speed to sixth speed every predetermined turning angle (for example, 60 degrees) and a neutral position on the way are formed there.

Accordingly, the turning of the shift drum 167 axially moves the shift pin 158 fitted into the shift groove 167v together with the control rod operating cylinder 155.

As the control rod operating cylinder 155 turnably holds the right end of the control rod 151, the turning of the shift drum 167 finally axially moves the control rod 151.

The shift drum 167 is turned by the manual operation of a shift select lever not shown via shift transmission means (not shown).

The shift transmission means is provided with a mechanism such as a shift cam for stably holding the shift drum 167 in the position of each shift stage at every predetermined angle, transmits the operational power of the shift select lever to a gear 167g formed at a side edge of the shift drum 167, and sequentially turns the shift drum 167 to the position of each shift stage.

As described above, in the shift driving means 150, the shift drum 167 is turned by the manual operation of the shift select lever, the turning of the shift drum 167 guides the shift pin 158 fitted into the shift groove 167v and axially moves it, the movement of the shift pin 158 axially moves the control rod 151 via the control rod operating cylinder 155, and the movement of the control rod 151 interlocks the eight cam rods Cao, Cao, Cae, Cae, Cbo, Cbo, Cbe, Cbe of the fitting means 120 via the lost motion mechanisms 152, 153.

The control rod 151, on which the lost motion mechanisms 152, 153 are mounted, is inserted into a hollow part of the counter gear shaft 112 and is arranged along the central axis.

An inside diameter of the hollow cylindrical counter gear shaft 112 is substantially equal to an outside diameter of the spring holder 152h, 153h of each lost motion mechanism 152, 153 and the spring holders 152h, 153h mounted on the control rod 151 are slidably inserted.

Figure 26:
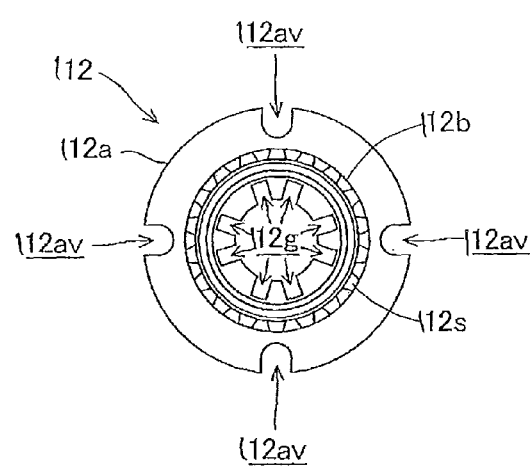
FIG. 26 is a left side view showing the counter gear shaft (a view viewed from a direction shown by an arrow IX in FIG. 25)

Eight cam guide grooves 112g each section of which is rectangular axially extend in eight radial positions on the inside periphery of the hollow counter gear shaft 112 (see FIG. 26).

The eight cam rods Cao, Cao, Cae, Cae, Cbo, Cbo, Cbe, Cbe are slidably fitted into the corresponding cam guide groove 112g in arrangement shown in FIG. 24.

The same type of cam rods C are arranged in symmetrical positions.

The section of the cam guide groove 112g that functions as a detent of the cam rod C for the counter gear shaft 112 is in a U-shaped simple shape and the cam guide groove can be easily worked.

The depth of the cam guide groove 112g is equal to the width in a radial direction of the cam rod C, therefore, the cam face which is the peripheral side of the cam rod C is slidingly touched to the bottom of the cam guide groove 112g, the inner side is touched to the outside periphery of the spring holder 152h, 153h substantially at the same level as the inside periphery of the hollow part, and the fitting pawl p projecting from the inner side grasps either of the spring holders 152h or 153h with the spring with the spring holder held from both sides.

Figure 25:
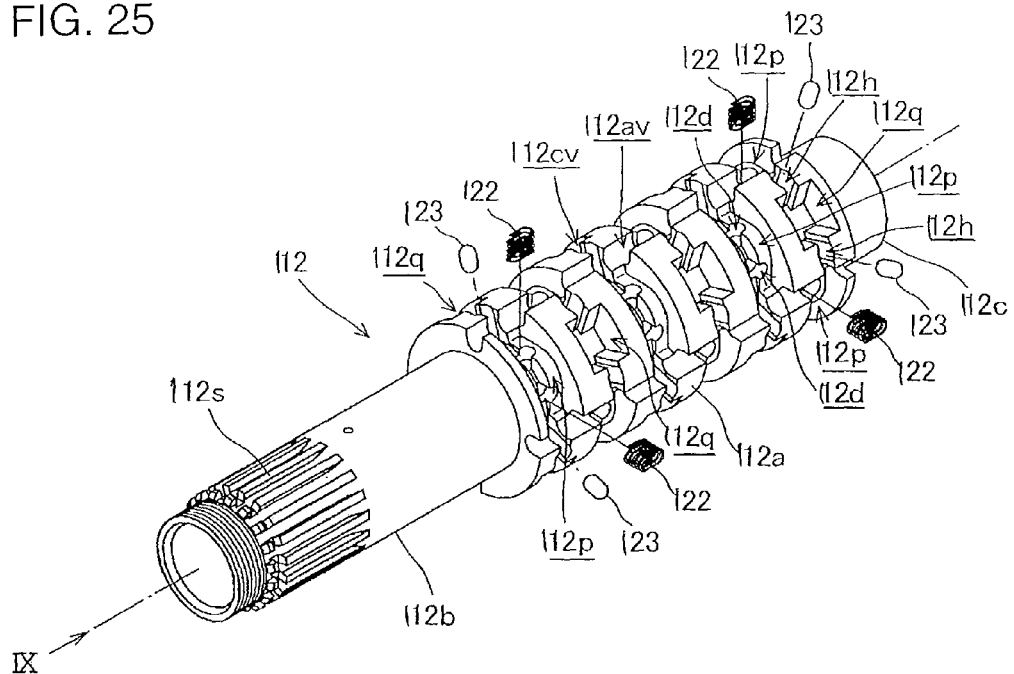
FIG. 25 is an exploded perspective view showing the counter gear shaft, a part of pins and a part of springs.

As for the hollow cylindrical counter gear shaft 112, a left cylindrical part 112b and a right cylindrical part 112c each outside diameter of which is reduced are formed on both sides of a central cylindrical part 112a to which the driven transmission gear n is journaled via the bearing collar 113 (see FIG. 25).

The bearing 7L is fitted to the left cylindrical part 112b via a washer 114L, a spline 112s is partially formed, the output sprocket (not shown) is fitted via the splines, and the bearing 107R is fitted to the right cylindrical part 112c via a washer 114R (see FIGS. 18, 19 and 20).

In the hollow part of the counter gear shaft 112, a small-diameter inside periphery the inside diameter where the cam guide groove 112g is formed of which is equal to the outside diameter of the spring holder 152h, 153h and a large-diameter inside periphery the inside diameter on both sides of the small-diameter inside periphery of which is at the substantially same level as the bottom of the cam guide groove 112g are formed (see FIGS. 19 and 20).

The control rod operating cylinder 155 is inserted approximately half inside a right extended inside diameter part.

Both ends of the fitting pin 159 that pierces the pin hole 151h formed at the two-plane width cut-out end 151aa at the left end of the control rod 151 are fitted to the cam guide grooves 112g located in symmetrical positions with the fitting pin functions as a detent. Therefore, the relative rotation of the control rod 151 is regulated, enabling the counter gear shaft 112 to be axially relatively moved, and the control rod is integrally rotated.

The fitting pin can function as the detent of the control rod 151 for the counter gear shaft 112 with a simple configuration wherein the fitting pin 159 is fitted utilizing the cam guide grooves 112g.

As described above, when the control rod 151, the lost motion mechanisms 152, 153 and the eight cam rods Cao, Cao, Cae, Cae, Cbo, Cbo, Cbe, Cbe are built in the hollow part of the counter gear shaft 112, all these are integrally turned, when the control rod 151 is axially moved, the cam rod Cbo for reverse rotation and odd-numbered speed and the cam rod Cae for normal rotation and even-numbered speed are axially interlocked via the coil spring 152s of the left lost motion mechanism 152, and the cam rod Cao for normal rotation and odd-numbered speed and the cam rod Cbe for reverse rotation and even-numbered speed are axially interlocked via the coil spring 153s of the right lost motion mechanism 153.

As the lost motion mechanisms 152, 153 are inserted between the outside face of the control rod 151 and the inside faces of the plural cam rods C with the lost motion mechanisms arranged in the axial direction of the counter gear shaft 112, the extension in the axial direction of the multistage transmission 110 is prevented because of a structure where the control rod 151, the lost motion mechanisms 152, 153 and the cam rods C are overlapped in the diametrical direction in the hollow part of the counter gear shaft 112, the lost motion mechanisms 152, 153 are compactly housed in the hollow part of the counter gear shaft 112. Thus, the multistage transmission 110 itself can be miniaturized.

As the two lost motion mechanisms 152, 153 are axially provided on the control rod 151 and each lost motion mechanism 152, 153 interlocks the separate cam rod C, the movement of one control rod 151 makes the plurality of cam rods C moved differently in two types and a shift can be smoothed, as the lost motion mechanisms 152, 153 are made to have the same structure, the manufacturing cost is inhibited, and the management of parts in assembly is facilitated.

As each coil spring 152s, 153s of the lost motion mechanisms 152, 153 is inserted into a space formed by each inside recessed portion 152ha, 153ha of the spring holders 152h, 153h inserted between the outside periphery of the control rod 151 and the inner sides of the plurality of cam rods C and the outside recessed portion 151a, 151b of the control rod 151, the lost motion mechanisms 152, 153 having the same shape can be configured on the control rod 151.

As the cotter 152c of the lost motion mechanism 152 (153) is split cotters divided in halves and the spring holder 152h (153h) is divided into the long holder 152hl (153hl) and the short holder 152hs (153hs) in two, the split cotters 152c are arranged in the recessed portions on both sides of the extended-diameter stopper part and the spring holder 152h (153h) can be simply mounted even if the extended-diameter stopper part 151as (151bs) is formed in the center in an axial direction of the outside recessed portion 151a (151b) of the control rod 151, and the assembly of the lost motion mechanism 152 (153) can be facilitated.

As shown in FIG. 25, the outside diameter of the central cylindrical part 112a to which the driven transmission gears n are journaled via the bearing collar 113 of the counter gear shaft 112 is formed larger and thick, six narrow circumferential grooves 112cv circumferentially surrounding it are axially formed at an equal interval on the thick outside periphery corresponding to the first, second, third, fourth, fifth and sixth driven transmission gears n1, n2, n3, n4, n5, n6, and four axial grooves 112av are circumferentially formed at an equal interval.

Further, a long rectangular recessed portion 112p laterally symmetrically extending between the axial grooves 112av where each of four parts partitioned by the four axial grooves 112av is adjacent to the groove width of each circumferential groove 112cv in each circumferential groove 112cv, and a short rectangular recessed portion 112q laterally symmetrically extending in a part between the axial grooves 112av adjacent to the groove width of the circumferential groove 112cv are axially alternately formed on the outside periphery of the central cylindrical part 112a of the counter gear shaft 112.

Spring bearers 112d in the shape of an axially long ellipse and slightly recessed along the circumferential groove 112cv are formed in two locations circumferentially apart at the bottom of the long rectangular recessed portion 112p.

In addition, a pin hole 112h is diametrically bored up to the cam guide groove 112g on the circumferential groove 112cv in the thick part between the short rectangular recessed portion 112q and the axial groove 112av.

More specifically, the pin hole 112h is bored in the radial direction of the cam guide grooves 112g circumferentially carved in four locations from the inside periphery of the hollow counter gear shaft 112.

Four pin holes 112$h$ are formed on each circumferential groove 112$cv$.

A compression spring 122 elliptically wound is provided to the spring bearer 112$d$ with its end fitted.

A pin 123 is slidably fitted into the pin hole 112$h$.

The width of the cam guide groove 112$g$ with which the pin hole 112$h$ communicates is smaller than the outside diameter of the pin 123.

Accordingly, as the pin 123 that advances and retreats in the pin hole 112$h$ is prevented from falling in the cam guide groove 112$g$, building the fitting means 120 in the counter gear shaft 112 is facilitated.

As the cam rods C are slidably fitted into the cam guide groove 112$g$, an end on the central side of the pin 123 fitted into the pin hole 112$h$ is touched to the cam face of the corresponding cam rod C, when the cam groove v is overlapped with the pin hole 112$h$ by the movement of the cam rod C, the pin 123 falls in the cam groove v, when the sliding face except the cam groove v is overlapped, the pin gets on the sliding face, and the pin advances and retreats by the movement of the cam rod C.

The advance and the retreat of the pin 123 in the pin hole 112$h$ make its end on the centrifugal side pushed outside the bottom of the circumferential groove 112$cv$ or pushed on the bottom.

A swingable pawl R is buried in the long rectangular recessed portion 112$p$, the short rectangular recessed portion 112$q$ and the circumferential groove 112$cv$ that communicates with both recessed portions respectively formed on the outside periphery of the central cylindrical part 112$a$ of the counter gear shaft 112 having the above-mentioned structure, and a journaling pin 126 that swingably journals the swingable pawl R is buried in the axial groove 112$av$.

Figure 28:
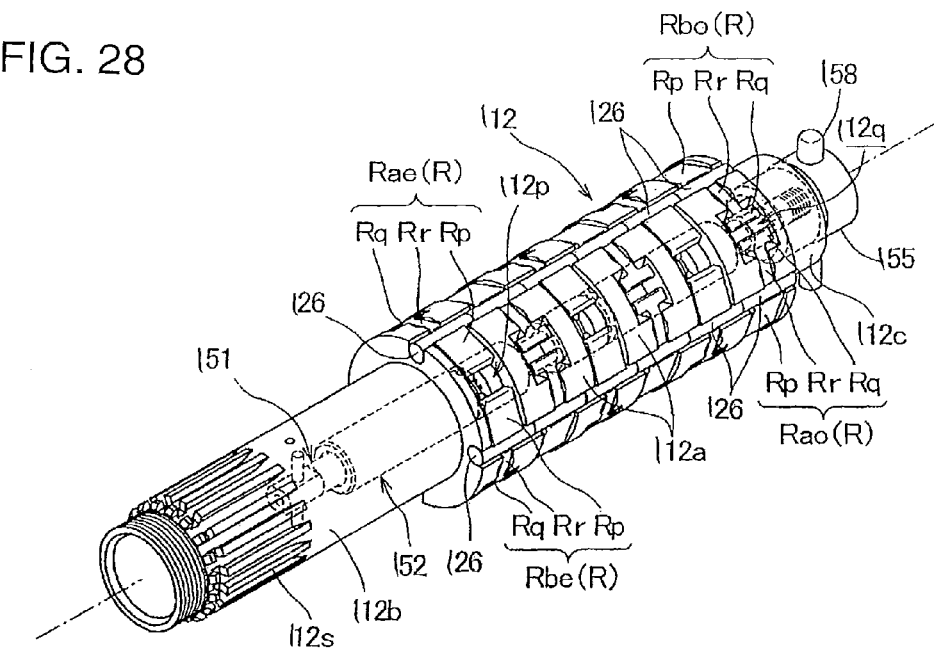
FIG. 28 is a perspective view showing a state in which a part of shift driving means and fitting means are mounted on the control rod.

FIG. 28 shows a state in which all the swingable pawls R are mounted as described above.

Figure 27:
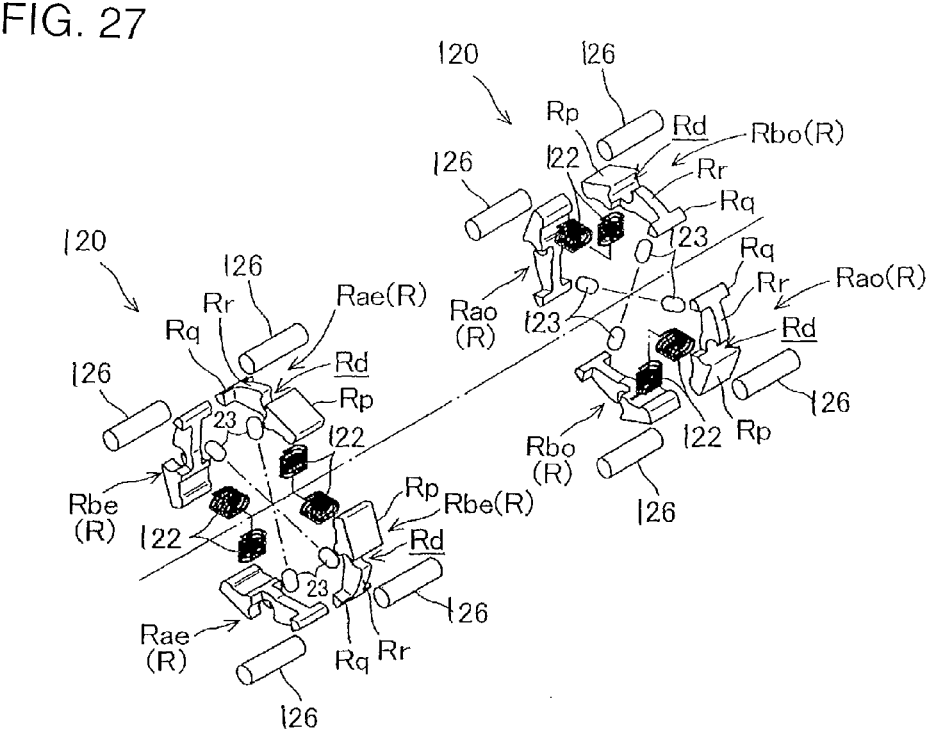
FIG. 27 is an exploded perspective view showing a swingable pawl, a journaling pin, a pin and a spring.

An exploded perspective view shown in FIG. 27 shows the four swingable pawls R buried in the circumferential groove 112$cv$, the long rectangular recessed portion 112$p$ and the short rectangular recessed portion 112$q$ respectively corresponding to the odd-numbered gears (the first, third and fifth driven transmission gears n1, n3, n5) and the four swingable pawls R buried in the circumferential groove 112$cv$, the long rectangular recessed portion 112$p$ and the short rectangular recessed portion 112$q$ respectively corresponding to the even-numbered gears (the second, fourth and sixth driven transmission gears n2, n4, n6) in positions in which mutual relative angular positional relation is maintained. In addition, the journaling pin 126 journals each swingable pawl R and the compression spring 122 acts on each swingable pawl R and the pin 123.

The swingable pawls R all have the same shape, the swingable pawl member is substantially in the shape of a circular arc in an axial view, the outside periphery of a through hole for the journaling pin 126 to pierce in the center is removed and a bearing recessed portion Rd is formed, with the bearing recessed portion Rd in the center of a swing, a wide rectangular fitting pawl member Rp swingably fitted into the long rectangular recessed portion 112$p$ is formed on one side, a narrow pin bearer Rr swingably fitted into the circumferential groove 112$cv$ in which the pin hole 112$h$ is formed and extends on the other side, its end reaches the short rectangular recessed portion 112$q$, and there, a wide end Rq is formed.

As for the swingable pawl R, the pin bearer Rr is fitted into the circumferential groove 112$cv$ in which the pin hole 112$h$ is formed, one fitting pawl member Rp is fitted into the long rectangular recessed portion 112$p$, the bearing recessed portion Rd is matched with the axial groove 112$av$, and the other wide end Rq is fitted into the short rectangular recessed portion 112$q$.

The journaling pin 126 is fitted into the matched bearing recessed portion Rd and axial groove 112$av$.

The swingable pawl R is symmetrically formed in relation to the fitted circumferential groove 112$cv$, one wide rectangular fitting pawl member Rp is heavier than the other pin bearer Rr and the other wide end Rq, and when the swingable pawl R is journaled to the journaling pin 126 and is turned together with the counter gear shaft 112, the fitting pawl member Rp acts as a weight against centrifugal force and swings the swingable pawl R so that the swingable pawl projects in a centrifugal direction.

The swingable pawl R is formed so that the width of the pin bearer Rr is narrower than that of the fitting pawl member Rp on the reverse side in relation to the center of a swing.

As the pin bearer Rr has only to have width enough to bear the pin 123, the swingable pawl R can be miniaturized and a swing by a centrifugal force by the other fitting pawl member Rp can be facilitated.

As the swingable pawls R circumferentially adjacent are mounted on the counter gear shaft 112 in mutually symmetrical positions, the fitting pawl members Rp opposite at a predetermined interval are fitted into the common long rectangular recessed portion 112$p$ and the other wide ends Rq mutually close are fitted into the common short rectangular recessed portion 112$q$.

The compression spring 122 one end of which is supported by the spring bearer 112$d$ of the counter gear shaft 112 is inserted inside the fitting pawl member Rp of the swingable pawl R and the pin 123 fitted into the pin hole 112$h$ is inserted between the cam rod C and the pin bearer inside the pin bearer Rr.

As described above, as the swingable pawl R is swingably journaled to the journaling pin 126, is buried in the long rectangular recessed portion 112$p$, the short rectangular recessed portion 112$q$ and the circumferential groove 112$cv$ respectively of the counter gear shaft 112, one fitting pawl Rp is pushed outside by the compression spring 122 and the other pin bearer Rr is pressed by the advance and the retreat of the pin 123, the swingable pawl R is swung against the pressure of the compression spring 122.

When the pin 123 centrifugally advances and swings the swingable pawl R, the fitting pawl member Rp of the swingable pawl R sinks in the long rectangular recessed portion 112$p$ and nothing projects outside from the outside periphery of the central cylindrical part 112$a$ of the counter gear shaft 112.

In addition, when the pin 123 retreats, the fitting pawl member Rp pushed by the compression spring 122 projects outside from the outside periphery of the central cylindrical part 112$a$ of the counter gear shaft 112 and the fitting to the driven transmission gear n is enabled.

As the compression spring 122 is in the shape of an ellipse its longer diameter of which is along the axis of the counter gear shaft 112, the longer diameter of the elliptic compression spring 122 is larger than the width of the pin bearer Rr of the swingable pawl R and the compression spring is caught across the round circumferential groove 112$cv$ into which the pin bearer Rr is swingably fitted, the working of the counter gear shaft 112 is facilitated and the swingable pawl R can be stably mounted on the counter gear shaft 112.

The four swingable pawls R corresponding to the odd-numbered gears (the first, third and fifth driven transmission gears n1, n3, n5) and the four swingable pawls R corresponding to the even-numbered gears (the second, fourth and sixth driven transmission gears n2, n4, n6) are located in the relative angular positional relation in which they are mutually turned by 90 degrees with the shaft in the center.

As for the four swingable pawls R corresponding to the odd-numbered gears (the first, third and fifth driven transmission gears n1, n3, n5), a pair of swingable pawls Rao for normal rotation and odd-numbered speeds which abut in a direction of the normal rotation of the gears and which are fitted so that each odd-numbered driven transmission gear n1, n3, n5 and the counter gear shaft 112 are synchronously turned and a pair of swingable pawl Rbo for reverse rotation and odd-numbered speeds which abut in a direction of the reverse rotation of the gears and which are fitted so that each odd-numbered driven transmission gear n1, n3, n5 and the counter gear shaft 112 are synchronously turned are provided in symmetrical positions.

Similarly, as for the four swingable pawls R corresponding to the even-numbered gears (the second, fourth and sixth driven transmission gears n2, n4, n6), a pair of swingable pawls Rae for normal rotation and even-numbered speeds which abut in the direction of the normal rotation of the gears and which are fitted so that each even-numbered driven transmission gear n2, n4, n6 and the counter gear shaft 112 are synchronously turned and a pair of swingable pawl Rbe for reverse rotation and even-numbered speeds which abut in the direction of the reverse rotation of the gears and which are fitted so that each even-numbered driven transmission gear n2, n4, n6 and the counter gear shaft 112 are synchronously turned are in symmetrical positions.

The swingable pawl Rao for normal rotation and even-numbered speed is swung by the pin 123 that advances and retreats by the movement of the cam rod Cao for normal rotation and odd-numbered speed and the swingable pawl Rbo for reverse rotation and odd-numbered speed is swung by the pin 123 that advances and retreats by the movement of the cam rod Cbo for reverse rotation and odd-numbered speed.

Similarly, the swingable pawl Rae for normal rotation and even-numbered speed is swung by the pin 123 that advances and retreats by the movement of the cam rod Cae for normal rotation and even-numbered speed and the swingable pawl Rbe for reverse rotation and even-numbered speed is swung by the pin 123 that advances and retreats by the movement of the cam rod Cbe for reverse rotation and even-numbered speed.

When the fitting means 120 is built in the counter gear shaft 112, the bearing collar 113 at the right end is first armored at an outside end of the central cylindrical part 112a, one end of the journaling pin 126 is fitted into the axial groove 112av inside the bearing collar 113, the fitting means 120 at the right end is built in, the next fitting means 120 is built in as the last fitting means after the next bearing collar 113 is armored to cover the other end of the journaling pin 126, the bearing collar 113 at the left end is finally armored by sequentially repeating the above-mentioned steps, and all the steps are finished.

Figure 29:
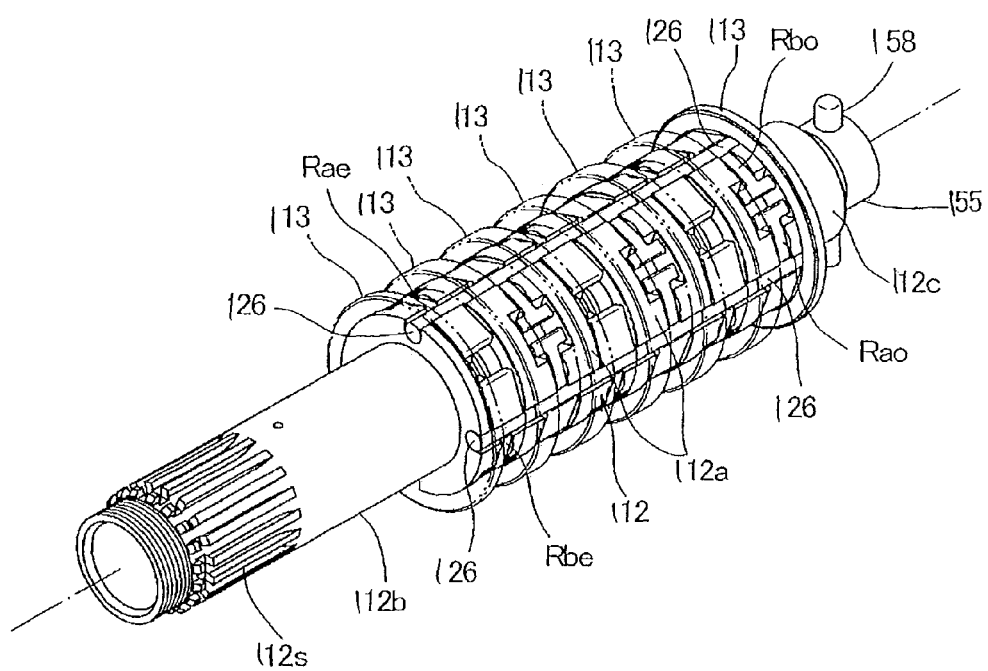
FIG. 29 is a perspective view showing a state in which one bearing collar is armored on the counter gear shaft in the state shown in FIG. 28.

As shown in FIG. 29, the bearing collar 113 is armored in axial positions except the long rectangular recessed portion 112p and the short rectangular recessed portion 112q respectively of the central cylindrical part 112a and is arranged across the adjacent journaling pins 126 continuously buried in the axial groove 112av in a line so as to prevent the journaling pin 126 and the swingable pawl R from falling.

As the journaling pin 126 buried in the axial groove 112av of the central cylindrical part 112a of the counter gear shaft 112 is buried in depth in contact with the outside periphery of the central cylindrical part 112a, the journaling pin is firmly fixed when the bearing collar 113 is armored.

The seven bearing collars 113 are armored at an equal interval on the counter gear shaft 112 and the driven transmission gear n is turnably journaled between the adjacent bearing collars 113.

Each driven transmission gear n is cut out at a lateral inside edge (a lateral peripheral edge of an inside face), a thin annular overhang 130 is formed between the lateral cutouts, and the lateral bearing collars 113 are slidably fitted into the cutouts with the overhang 130 held between the collars (see FIGS. 19 and 20).

Six fitting projection portions 131 are circumferentially formed in the overhang 130 of the inside face of the each driven transmission gear n at an equal interval (see FIGS. 19, 20, 21 and 22).

The fitting projection portion 131 is in the shape of a thin circular arc in a side view (an axial view shown in FIGS. 21 and 22) and its circumferential both end faces function as a fitting face for fitting to the fitting pawl member Rp of the swingable pawl R.

The fitting pawl members Rp of the swingable pawl Rao for normal rotation and odd-numbered speed (the swingable pawl Rae for normal rotation and even-numbered speed) and the swingable pawl Rbo for reverse rotation and odd-numbered speed (the swingable pawl Rbe for reverse rotation and even-numbered speed) extends on the mutually opposite side, the swingable pawl Rao for normal rotation and odd-numbered speed (the swingable pawl Rae for normal rotation and even-numbered speed) is touched and fitted to a fitting projection portion 131 in a direction of the normal rotation of the driven transmission gear n (and the counter gear shaft 112), and the swingable pawl Rbo for reverse rotation and odd-numbered speed (swingable pawl Rbe for reverse rotation and even-numbered speed) is touched and fitted to the fitting projection portion 131 in a direction of the reverse rotation of the driven transmission gear n.

The swingable pawl Rao for normal rotation and odd-numbered speed (the swingable pawl Rae for normal rotation and even-numbered speed) is not fitted even if the fitting pawl member Rp projects outside when the driven transmission gear n is turned in a reverse direction. Similarly, the swingable pawl Rbo for reverse rotation and odd-numbered speed (the swingable pawl Rbe for reverse rotation and even-numbered speed) is not fitted even if the fitting pawl member Rp projects outside when the driven transmission gear n is normally turned.

A procedure for mounting the above-mentioned fitting means 120 on the counter gear shaft 112 will be described below.

The left and right two lost motion mechanisms 152, 153 are mounted on the control rod 151 to which the control rod operating cylinder 155 and the fitting pin 159 are attached and the control rod is inserted into the hollow part of the counter gear shaft 12 in a state in which the eight cam rods Cao, Cao, Cae, Cae, Cbo, Cbo, Cbe, Cbe are arranged on the outside peripheries of the lost motion mechanisms 152, 153.

At that time, the eight cam rods Cao, Cao, Cae, Cae, Cbo, Cbo, Cbe, Cbe are inserted into the corresponding eight cam guide grooves 112g.

Lateral moving positions for the counter gear shaft 112 of the eight cam rods Cao, Cao, Cae, Cae, Cbo, Cbo, Cbe, Cbe are set neutral.

The counter gear shaft 112 in such a state is made to stand with the left side held higher.

First, as shown by a full line in FIG. 29, after the bearing collar 113 at a right end is armored at a lower end (the right end) of the central cylindrical part 112a, the pin 123 is inserted into the pin hole 112h in the circumferential groove 112cv corresponding to the lowest first driven transmission gear n1, one end of the compression spring 122 is supported by the spring bearer 112d, the swingable pawl R is fitted into the long rectangular recessed portion 112p, the short rectangular recessed portion 112q and the circumferential groove 112cv, the journaling pin 126 is fitted into the axial groove 112av inside the bearing collar 113 at the right end and simultaneously, is fitted into the bearing recessed portion Rd of the swingable pawl R, and the swingable pawl R is mounted.

The cam rod C is located in neutral, the pin 123 is touched to the sliding face except the cam groove, the pin advances and presses the pin bearer Rq of the swingable pawl R from the inside, swings it against the pressure of the compression spring 122 so as to sink the fitting pawl member Rp in the long rectangular recessed portion 112p, and the pin makes nothing project outside from the outside periphery of the central cylindrical part 112a.

When the four swingable pawls R in the circumferential groove 112cv corresponding to the first driven transmission gear n1 are mounted, the first driven transmission gear n1 is fitted from the upside, the overhang 130 of the first driven transmission gear n1 is touched to the bearing collar 113 and the cutout is fitted, next, the second bearing collar 113 is fitted from the upside, is fitted to the cutout of the first driven transmission gear n1 and is armored in a predetermined position of the counter gear shaft 112, and the first driven transmission gear n1 is axially positioned and mounted.

Next, the fitting means 120 for the second driven transmission gear n2 is mounted, the second driven transmission gear n2 is attached, afterward, the residual third, fourth, fifth and sixth driven transmission gears n3, n4, n5, n6 are sequentially mounted by repeating this work, and finally, the seventh bearing collar 113 is armored.

In a state in which the six driven transmission gears n are mounted on the counter gear shaft 112 as described above, as shown in FIG. 18, when the counter gear shaft 112 is turnably journaled to the left and right bearings 107L, 107R fitted to the left engine casing 101L and the side wall 101RR of the right engine casing 101R via the washer 114L, 114R with the counter gear shaft held between the bearings 107L, 107R, the six driven transmission gears n and the seven bearing collars 113 are alternately combined, are laterally held, and they are axially positioned.

The bearing collar 113 bears the axial force of each driven transmission gear n, axially positions, and can receive thrust.

As described above, the first, second, third, fourth, fifth and sixth driven transmission gears n1, n2, n3, n4, n5, n6 are turnably journaled to the counter gear shaft 112 via the bearing collars 113.

As the cam rod C is neutral, all the driven transmission gears n are in a fitting released state in which the pin 123 projects depending upon moving positions of the cam rods C of the corresponding fitting means 120, the pin bearer Rq of the swingable pawl R is pushed up from the inside and the fitting pawl member Rp is drawn inside, and all the driven transmission gears are freely turned for the counter gear shaft 112.

In addition, in a fitting enabled state in which the pin 123 enters the cam groove v depending upon moving positions except neutral of the cam rods C of the fitting means 120, the swingable pawl R is swung and the fitting pawl member Rp projects outside, the fitting projection portion 131 of the corresponding driven transmission gear n is touched to the fitting pawl member Rp, the turning of the driven transmission gear n is transmitted to the counter gear shaft 112 or the rotation of the counter gear shaft 112 is transmitted to the corresponding driven transmission gear n.

In the shift driving means 150, the shift drum 167 is turned by a predetermined quantity by the manual operation of the shift select lever, the turning of the shift drum 167 axially moves the control rod 151 by a predetermined quantity via the shift pin 158 fitted into the shift groove 167v, and the eight cam rods Cao, Cao, Cae, Cae, Cbo, Cbo, Cbe, Cbe of the fitting means 120 are interlocked via the lost motion mechanisms 152, 153.

When the cam rods are axially moved, the pin 123 slidingly touched to the cam face of the cam rod C enters or exits from the cam groove v, advances or retreats, the swingable pawl R is swung, the fitting to the driven transmission gear n is released, another driven transmission gear n is fitted, and a shift is executed by changing the driven transmission gear n fitted to the counter gear shaft 112.

In the case of a shift by the manual operation of the shift select lever, one operation of the shift select lever turns the shift drum 167 by a predetermined angle, moves the control rod 151 via the shift pin 158 and the control rod operating cylinder 155 by predetermined quantity (equivalent to one stage of the shift), the shift select lever itself is returned to an original position, and the next shift is prepared.

FIGS. 19 to 22 show an accelerated state of the first speed, to consider a case of a shift from the accelerated state of the first speed to the second speed by the manual operation of the shift select lever, the shift drum 167 is turned by the predetermined angle by the manual operation of the shift select lever, and the control rod 151 is moved to the right in the axial direction via the shift pin 158 by the predetermined quantity.

When the control rod 151 is moved to the right, the eight cam rods Cao, Cao, Cae, Cae, Cbo, Cbo, Cbe, Cbe are interlocked via the coil springs 152s, 153s of the lost motion mechanisms 152, 153 and the rightward movement in the axial direction is tried. However, as the swingable pawl Rao for normal rotation and odd-numbered speed which the cam rod Cao for normal rotation and odd-numbered speed operates via the pin 123 is fitted to the fitting projection portion 131 of the first driven transmission gear n1 and receives power from the first driven transmission gear n1, there is a considerably large frictional resistance for the swing of the swingable pawl Rao for normal rotation and odd-numbered speed and the release of the fitting, there is immediately no movement. Therefore, the cam rod Cbe for reverse rotation and even-numbered speed also remains stopped. However, the cam rod Cae for normal rotation and even-numbered speed and the cam rod Cbo for reverse rotation and odd-numbered speed are moved without resistance.

The swingable pawl Rbo for reverse rotation and odd-numbered speed of the first speed draws its fitting pawl member Rp inside by the movement of the cam rod Cbo for reverse rotation and odd-numbered speed.

Figure 30:
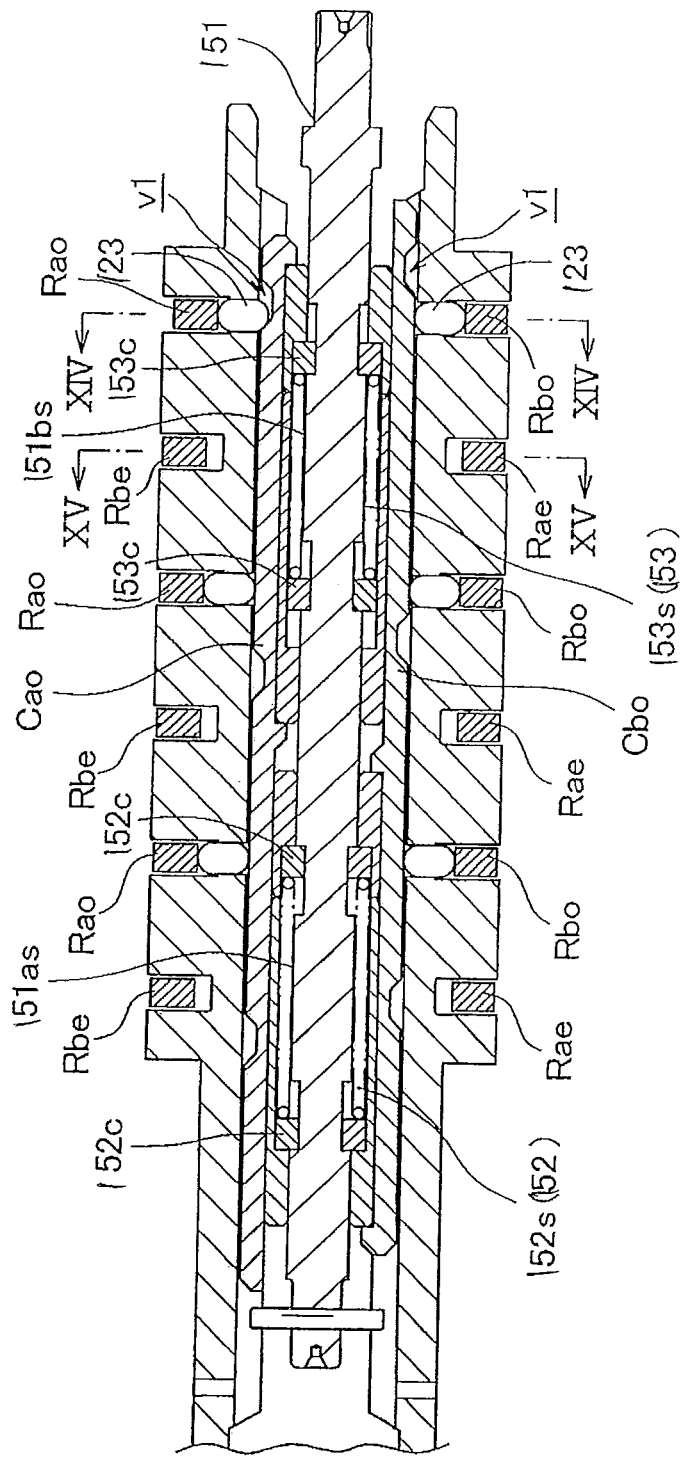
FIG. 30 is a sectional view showing the counter gear shaft immediately before an upward shift to second speed is completed and the structure around it.
Figure 31:
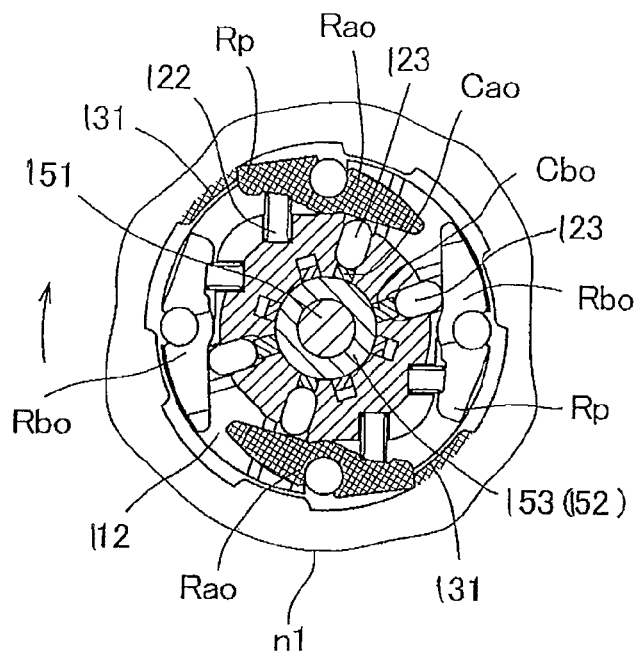
FIG. 31 is a sectional view viewed along a line XIV-XIV in FIG. 30.
Figure 32:
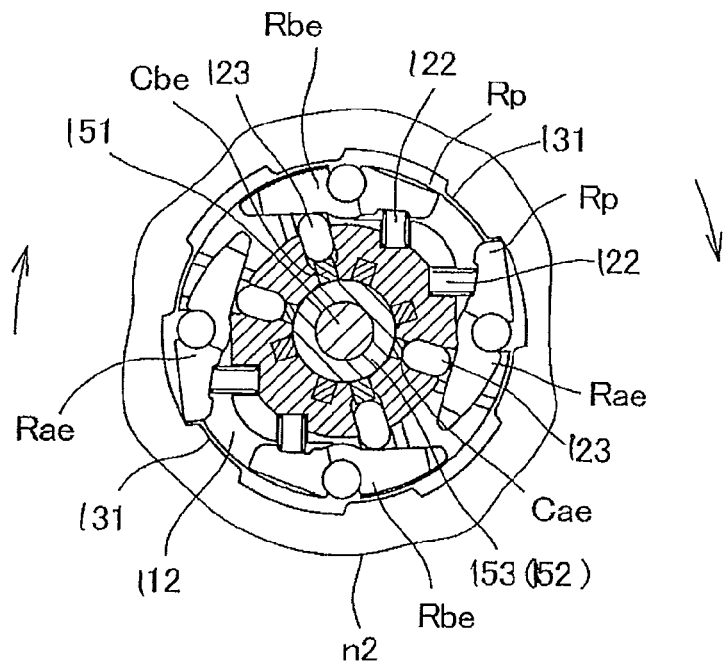
FIG. 32 is a sectional view viewed along a line XV-XV in FIG. 30.

As shown in FIGS. 30 to 32, the pin 123 enters the cam groove v2 by the movement of the cam rod Cae for normal rotation and even-numbered speed. Therefore, the swingable pawl Rae for normal rotation and even-numbered speed corresponding to the second driven transmission gear n2 is swung by the pressure of the compression spring 122 and the centrifugal force of the fitting pawl member Rp, the fitting pawl member Rp projects outside and can be fitted to the second driven transmission gear n2, and the fitting projection portion 131 of the second driven transmission gear n2 turned at higher speed than the counter gear shaft 112 rotated together with the first driven transmission gear n1 catches up with the fitting pawl member Rp projecting outside of the swingable pawl Rae for normal rotation and even-numbered speed and is touched to it.

FIGS. 30 to 32 show a state immediately before the fitting projection portion 131 of the second driven transmission gear n2 catches up with the fitting pawl member Rp projecting outside of the swingable pawl Rae for normal rotation and even-numbered speed. FIG. 31 shows a state in which the fitting projection portion 131 of the first driven transmission gear n1 is fitted to the swingable pawl Rao for normal rotation and odd-numbered speed and simultaneously shows a state immediately before the fitting projection portion 131 of the second driven transmission gear n2 catches up with the fitting pawl member Rp projects outside of the swingable pawl Rae for normal rotation and even-numbered speed as shown in FIG. 32.

At this time, as the swingable pawl Rao for normal rotation and odd-numbered speed is still fitted to the fitting projection portion 131 of the first driven transmission gear n1 and receives power from the first driven transmission gear n1, the control rod 151 is moved. However, the cam rod Cao for normal rotation and odd-numbered speed remains stopped because of frictional resistance, and as shown in FIG. 30, the extended-diameter stopper part 151bs of the control rod 151 is substantially touched to the right cotter 153c of the lost motion mechanism 153.

Even if the operation for an upward shift of the shift select lever is made again till this time, the control rod 151 is touched to the right cotter 153c of the lost motion mechanism 153 integrated with the cam rod Cao for normal rotation and odd-numbered speed in a state in which the extended-diameter stopper part 151bs is stopped, the movement is prohibited, and the operation for the upward shift continuous at an extremely short time interval is disenabled.

When the fitting projection portion 131 of the second driven transmission gear n2 catches up with the fitting pawl member Rp projecting outside of the swingable pawl Rae for normal rotation and even-numbered speed from the state shown in FIGS. 30 to 32, the counter gear shaft 112 starts to be rotated at the same revolution speed as the second driven transmission gear n2 by the second driven transmission gear n2 turned at higher speed, the fitting pawl member Rp of the swingable pawl Rao for normal rotation and odd-numbered speed is separated from the fitting projection portion 131 of the first driven transmission gear n1, and the actual upward shift from the first speed to the second speed is executed.

When the fitting pawl member Rp of the swingable pawl Rao for normal rotation and odd-numbered speed is separated from the fitting projection portion 131 of the first driven transmission gear n1, frictional resistance that fixes the swingable pawl Rao for normal rotation and odd-numbered speed gets lost, the cam rod Cao for normal rotation and odd-numbered speed pressed by the coil spring 153s of the lost motion mechanism 153 is moved to the right behind, the pin 123 located in the cam groove v1 gets out of the cam groove, the swingable pawl Rao for normal rotation and odd-numbered speed is swung, and the fitting pawl member Rp is drawn inside.

As described above, as the fitting projection portion 131 of the first driven transmission gear n1 is touched and fitted to the fitting pawl member Rp of the swingable pawl Rao for normal rotation and odd-numbered speed when the accelerated state of the first speed is shifted to the second speed the speed reducing ratio of which is smaller by one stage, the fitting projection portion 131 of the second driven transmission gear n2 turned at higher speed catches up with the fitting pawl member Rp of the swingable pawl Rae for normal rotation and even-numbered speed and is touched to it in a state in which the counter gear shaft 112 is rotated at the same speed as the first driven transmission gear n1, the counter gear shaft 112 is rotated at higher speed together with the second driven transmission gear n2 and the shift is executed, the fitting pawl member Rp of the swingable pawl Rao for normal rotation and odd-numbered speed is naturally separated from the fitting projection portion 131 of the first driven transmission gear n1, as the fitting is smoothly released, no power is required for releasing the fitting, and smooth operation and the smooth shift are enabled.

Also similarly in each shift from the second speed to the third speed, from the third speed to the fourth speed, from the fourth speed to the fifth speed and from the fifth speed to the sixth speed, as the driven transmission gear n the speed reducing ratio of which is smaller by one stage is fitted to the swingable pawl R in a state in which the driven transmission gear n is fitted to the swingable pawl R and a shift is executed, smooth operation is enabled without power to release the fitting, no clutch for the shift is required, no switching time is lost in the shift, no driving force is also lost, shift shock is also small, and a smooth shift can be executed.

Also similarly in a downward shift, as the swingable pawl R is fitted to the driven transmission gear n the speed reducing ratio of which is larger by one stage in a state in which the driven transmission gear n is fitted to the swingable pawl R and the downward shift is executed, no power for releasing the fitting is required, smooth operation is enabled, no clutch for the shift is required, no switching time is lost in the downward shift, no driving force is also lost, shift shock is also small, and a smooth downward shift can be executed.

As hitherto, no lost motion regulating means such as the extended-diameter stopper parts 151as, 151bs is provided to the control rod 151, the control rod 151 can be moved without regulation when the operation for the upward shift of the shift select lever is executed again in the operation for the upward shift of the shift select lever so as to make a shift from the first speed to the second speed for example before the state shown in FIGS. 30 to 32 (before the fitting pawl member Rp of the swingable pawl Rao for normal rotation and odd-numbered speed is separated from the fitting projection portion 131 of the first driven transmission gear n1 and the fitting is released). Therefore, the shift drum 167 is turned and moves the control rod 151 to the right, the spring 153s of the lost motion mechanism 153 is further compressed, the fitting pawl member Rp projects outside of the swingable pawl Rae for normal rotation and even-numbered speed is drawn by the movement of the cam rod Cae for normal rotation and even-numbered speed and cannot be fitted to the fitting projection portion 131 of the second driven transmission gear n2. Accordingly, the fitting of the fitting projection portion 131 of the first driven transmission gear n1 to the fitting pawl member Rp of the swingable pawl Rao for normal rotation and odd-numbered speed is not released. Finally, the shift is disenabled.

Nevertheless, as the shift drum 167 is turned, a situation that a shift position of the shift drum 167 and actual speed are not matched occurs.

In the meantime, as in this multistage transmission 110, the extended-diameter stopper parts 151as, 151bs are provided to the control rod 151 and the lost motion regulating means that prohibits lost motion operation over one stage of a shift is provided, a wrong operation can be prevented because the operation in the same direction of the shift select lever is prohibited before the operation for a shift for one stage is executed by the manual operation of the shift select lever and fitting by the fitting means before the shift is released. Thus, a situation wherein a shift position of the shift drum 67 and actual speed are not matched can be avoided.

Though lost motion operation over one stage is prohibited by the extended-diameter stopper parts 151as, 151bs in the upward shift, it is also applied to a downward shift.

As these lost motion mechanisms 152, 153 are provided between the outside periphery of the control rod 151 and each inside face of the eight cam rods C, the width in the axial direction is not required to extend because of the arrangement of the lost motion mechanisms 152, 153. Thus, the width in the axial direction of the multistage transmission 110 can be reduced.

Next, referring to FIG. 33, another embodiment will be described.

Figure 33:
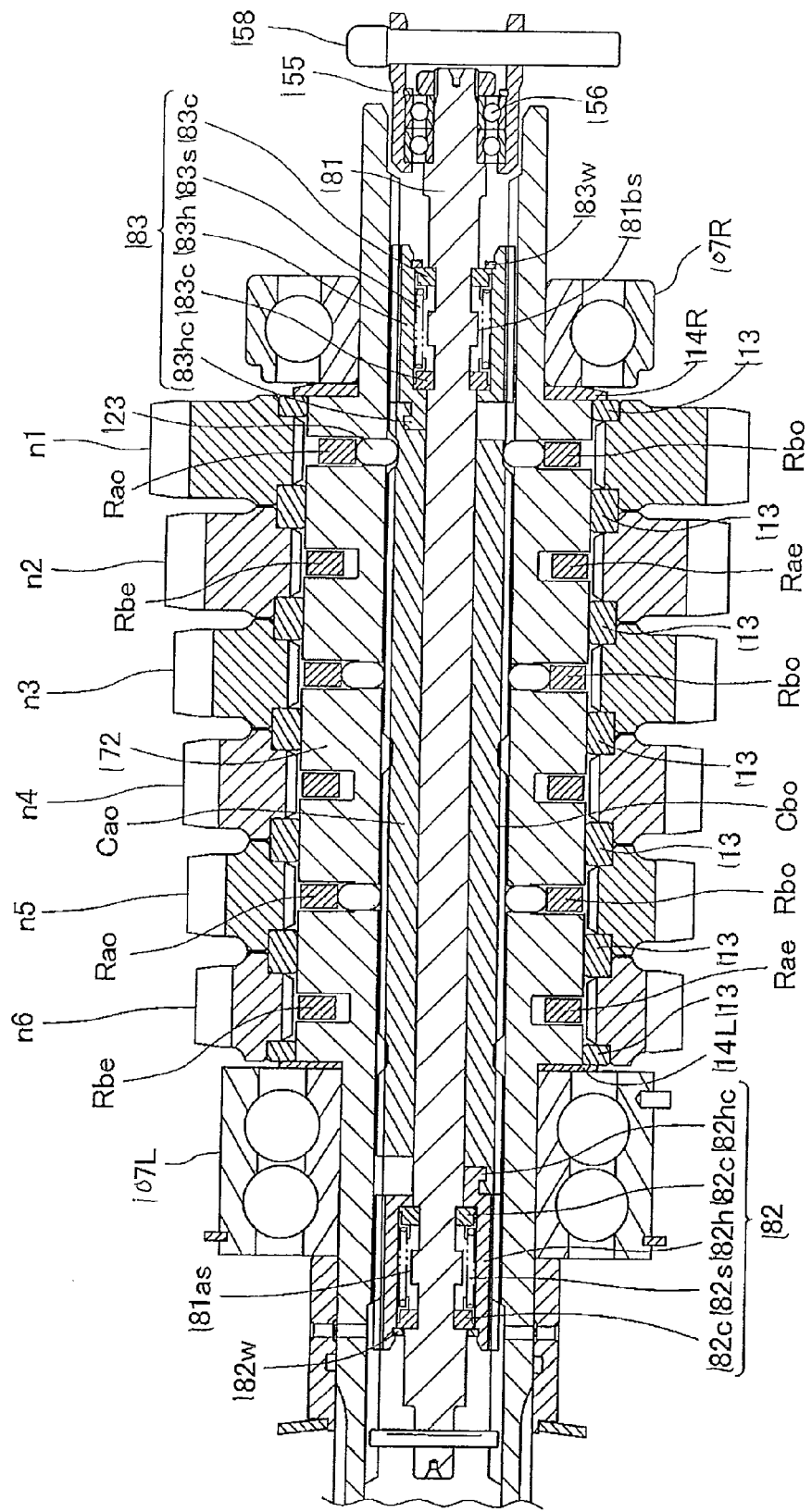
FIG. 33 is a sectional view showing a counter gear shaft of a multistage transmission equivalent to another embodiment and structure around it.

FIG. 33 is a sectional view showing a counter gear shaft 172 and the structure around it of a multistage transmission equivalent to this embodiment.

The lost motion mechanisms 152, 153 in the above-mentioned embodiment are provided between the outside periphery of the control rod 151 and each inside face of the eight cam rods C, while lost motion mechanisms 182, 183 in this embodiment are provided between an end in an axial direction of a cam rod C and the outside periphery of a control rod 181 and the structure except it is basically the same.

The numeral or character of the equivalent member in the above-mentioned embodiment is used for members except for a counter gear shaft 172, the control rod 181 and the lost motion mechanisms 182, 183.

Eight cam rods C are slidingly touched to the outside periphery of the control rod 181, an outside recessed portion is formed in right and left parts located on both sides in an axial direction of the control rod 181, each spring 182s, 183s is housed between each inside recessed portion (at one end, each snap ring 182w, 183w is provided) of cylindrical spring holders 182h, 183h and each right and left reduced-diameter part, and each spring 182s, 183s is held between split cotters 182c or 183c on both sides each of which is fitted into both of the inside recessed portion and the reduced-diameter part.

As for the left spring holder 182h, a part opposite to two types of four cam rods Cbo for reverse rotation and odd-numbered speed and Cae for normal rotation and even-numbered speed respectively on its right end face is protruded, a fitting pawl 182hc is formed there, each fitting pawl formed in the cam rod Cbo for reverse rotation and odd-numbered speed and the cam rod Cae for normal rotation and even-numbered speed and the fitting pawl 182hc are mutually fitted, and the left spring holder and the cam rods are integrally axially slidably coupled.

Similarly, as for the right spring holder 183h, a part opposite to two types of four cam rods Cao for normal rotation and odd-numbered speed and Cbe for reverse rotation and even-numbered speed respectively on its left end face projects, a fitting pawl 183hc is formed there, each fitting pawl formed in the cam rod Cao for normal rotation and odd-numbered speed and the cam rod Cbe for reverse rotation and even-numbered speed and the fitting pawl 183hc are mutually fitted, and the right spring holder and the cam rods are integrally axially slidably coupled.

The lost motion mechanisms 182, 183 fulfill the same function as the lost motion mechanisms 152, 153 in the above-mentioned embodiment.

An extended-diameter stopper part 181as, 181bs the diameter of which is extended is formed in the center in the axial direction of each outside recessed portion of the control rod 181.

When the extended-diameter stopper part 181as (181bs) is located between the right and left cotters 182c (183c) and a certain speed is established, the distance between the extended-diameter stopper part 181as (181bs) of the control rod 181 and the cotter 182c (183c) on each side is equivalent to one stage of a shift.

Accordingly, when the control rod 181 is axially moved by one stage, the spring holders 182h, 183h are axially moved via compression coil springs 182s, 183s of the left and right lost motion mechanisms 182, 183.

If the movement over one stage of the control rod 181 is tried, the extended-diameter stopper part 182as, 182bs of the control rod 181 is touched to one cotter 182c, 183c. Thus, the movement of the control rod 181 is regulated.

Accordingly, as the further operation in the same direction of a shift select lever is prohibited before a shift for one stage is manually operated by the shift select lever and fitting by fitting means before the shift is released, wrong operation can be prevented and a situation that a shift position of the shift drum 167 and actual speed are not matched can be avoided.

As these lost motion mechanisms 182, 183 are coupled to axial ends of required cam rods C, they can be easily attached and are excellent in assembly workability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multistage transmission where a plurality of driving gears and a plurality of driven gears are journalled to mutually parallel gear shafts in a constantly engaged state for every speed, the plurality of gears of either of the driving gears or the driven gears are fixed to one of the gear shafts, and a shift is executed by switching fitting means which are provided between the other plurality of gears and another one of the gear shafts and which fit each other by shift driving means and driving a new gear;

wherein the fitting means includes a first fitting device for normal rotation and a second fitting device for reverse rotation, and the fitting means is fittable in a rotation direction of the normal rotation in which power from an internal combustion engine is transmitted and a rotation direction of the reverse rotation in which power from the side of a driving wheel is transmitted;

wherein each fitting device is provided with:
a fitting projection portion provided to a plurality of locations in a circumferential direction on an inside periphery of each gear with a fitting face in the circumferential direction;
a fitting member provided to a corresponding one of the gear shafts with the fitting member projecting or drawn in and detachably fitted to the fitting projection portion of each gear;
a plurality of cam rods which are axially slidably supported by the corresponding one of the gear shafts and on each sliding face of which a plurality of cam grooves are formed in axial required locations; and
a pin diametrically inserted into required locations of the corresponding one of the gear shafts, which is alternately touched to the sliding face of a corresponding one of the cam rods axially moved and the cam groove of the corresponding one of the cam rods, advances and retreats and which operates the fitting member; and wherein the shift driving means is provided with:

a control rod provided along a central axial of a hollow part of the corresponding one of the gear shafts inside the plurality of cam rods; and a lost motion mechanism which is inserted between an outside periphery of the control rod and each inside face of the plurality of cam rods and which interlocks the control rod and each cam rod via a spring that axially acts;

wherein a regulating rod integrally moved with the control rod is provided to the corresponding one of the gear shafts with the regulating rod slidingly touched to the corresponding one of the cam rods;

wherein a cutout into which the pin can be fitted together with the cam groove of the slidingly touched cam rod is formed corresponding to each cam groove in the regulating rod;

wherein the cutout of the regulating rod corresponding to a cam groove of a cam rod for normal rotation is formed longer than a cam groove on the reverse side to a moving direction of the control rod in an upward shift in a state in which shifted speed is established; and the cutout of the regulating rod corresponding to a cam groove of a cam rod for reverse rotation is foamed longer than a cam groove on the reverse side to a moving direction of the control rod in a downward shift in a state in which shifted speed is established.

2. The multistage transmission according to claim 1, wherein the regulating rod is axially relatively slidably provided, and held between the cam rod for normal rotation and the cam rod for reverse rotation.

3. The multistage transmission according to claim 2, wherein the regulating rod is formed by a separate member from the control rod; and the regulating rod is connected by connecting means to enable integral movement with the control rod.

4. The multistage transmission according to claim 3, wherein the connecting means is a half cotter; and the half cotter is fitted into both a fitting groove provided to the outside periphery of the control rod and a fitting groove provided to an inside face of the regulating rod and the regulating rod is integrally connected to the control rod.

5. The multistage transmission according to claim 2, wherein the cam rods having the same function and the regulating rods having the same function are arranged in symmetrical positions with them opposite to the outside periphery of the control rod.

6. The multistage transmission according to claim 1, wherein the regulating rod is formed by a separate member from the control rod; and the regulating rod is connected by connecting means to enable integral movement with the control rod.

7. The multistage transmission according to claim 6, wherein the connecting means is a half cotter; and the half cotter is fitted into both a fitting groove provided to the outside periphery of the control rod and a fitting groove provided to an inside face of the regulating rod and the regulating rod is integrally connected to the control rod.

8. The multistage transmission according to claim 7, wherein the cam rods having the same function and the regulating rods having the same function are arranged in symmetrical positions with them opposite to the outside periphery of the control rod.

9. The multistage transmission according to claim 6, wherein the cam rods having the same function and the regulating rods having the same function are arranged in symmetrical positions with them opposite to the outside periphery of the control rod.

10. The multistage transmission according to claim 1, wherein the cam rods having the same function and the regulating rods having the same function are arranged in symmetrical positions with them opposite to the outside periphery of the control rod.

* * * * *